(12) United States Patent
Freda et al.

(10) Patent No.: US 12,213,192 B2
(45) Date of Patent: Jan. 28, 2025

(54) DETERMINING WHETHER AN INACTIVE RELAY WTRU MAY INDEED SERVE A NETWORK-INITIATED CONNECTION AT A REMOTE SERVED WTRU

(71) Applicant: InterDigital Patent Holdings, Inc., Wilmington, DE (US)

(72) Inventors: Martino Freda, Laval (CA); Jaya Rao, Montreal (CA); Tao Deng, New York, NY (US); Tuong Hoang, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/779,540

(22) Filed: Jul. 22, 2024

(65) Prior Publication Data

US 2024/0422841 A1    Dec. 19, 2024

Related U.S. Application Data

(63) Continuation of application No. 18/029,762, filed as application No. PCT/US2021/054811 on Oct. 13, 2021.

(60) Provisional application No. 63/136,430, filed on Jan. 12, 2021, provisional application No. 63/091,488, filed on Oct. 14, 2020.

(51) Int. Cl.
*H04W 76/14*    (2018.01)
*H04W 76/27*    (2018.01)
*H04W 88/04*    (2009.01)

(52) U.S. Cl.
CPC .......... *H04W 76/14* (2018.02); *H04W 76/27* (2018.02); *H04W 88/04* (2013.01)

(58) Field of Classification Search
CPC ...... H04W 76/14; H04W 76/27; H04W 88/04
See application file for complete search history.

(56) References Cited

U.S. PATENT DOCUMENTS

2022/0095411 A1\*    3/2022    Lin .................... H04W 76/27

FOREIGN PATENT DOCUMENTS

GB    2555662 A    5/2018

OTHER PUBLICATIONS

R2-166914, "Procedures for remote or relay UE in idle mode", Huawei et al.: 3GPP TSG-RAN WG2 Meeting #95bis, Oct. 2016.
(Continued)

*Primary Examiner* — Thomas R Cairns
(74) *Attorney, Agent, or Firm* — Flaster Greenberg, P.C.

(57) ABSTRACT

Methods and corresponding apparatuses are provided herewith for determining whether a relay wireless transmit/receive unit, WTRU, may serve a network initiated connection at a remote WTRU based on the coverage status of the remote WTRU, on a Channel Busy Ratio, CBR, and on access control decision made by the network. The methods may comprise receiving an In-Coverage, IC, indication from the remote WTRU, indicating that the remote WTRU is IC of a suitable cell; receiving a paging message intended for a remote WTRU of a set of remote WTRUs handled by the relay WTRU; and on condition that the CBR is above a threshold, forwarding the paging message on Sidelink and indicating to the remote WTRU to trigger a Radio Resource Control, RRC, connection via Uu.

14 Claims, 8 Drawing Sheets

(56) References Cited

OTHER PUBLICATIONS

R2-1701414, "Considerations on Initiation of connection by Network", ITL: 3GPP TSG-RAN WG2 Meeting #97, Feb. 2017.
R2-2006571, "RRC States for Relaying", Mediatek Inc: 3GPP TSG-RAN WG2 Meeting #11 1-e; Aug. 2020.
3GPP TSG RAN Meeting #86, RP-193253, New SID: Study on NR Sidelink Relay, OPPO, Sitges, Spain, Dec. 9-12, 2019.
3GPP TS 36.300 V15.4.0, "Evolved Universal Terrestrial Radio Access (E-UTRA) and Evolved Universal Terrestrial Radio Access Network (E-UTRAN); Overall description; Stage 2", Dec. 2018.
3GPP TR 36.746 V15.1.1, "Study on further enhancements to LTE Device to Device (D2D), User Equipment (UE) to network relays for Internet of Things (IOT) and wearables", Apr. 2018.
3GPP TS 38.300 V16.1.0, "NR and NG-RAN Overall Description"; Stage 2, Release 16, March.

\* cited by examiner

DETERMINING WHETHER AN INACTIVE RELAY WTRU MAY INDEED SERVE A NETWORK-INITIATED CONNECTION AT A REMOTE SERVED WTRU

CROSS-REFERENCE TO RELATED APPLICATIONS

This application is a continuation of U.S. Non-Provisional patent application Ser. No. 18/029,762, filed Mar. 31, 2023, which is the U.S. National Stage Application under 35 U.S.C. 371 of International Patent Application No. PCT/US2021/054811, filed Oct. 13, 2021, which claims the benefit of U.S. Provisional Patent Application No. 63/136,430, filed Jan. 12, 2021, and U.S. Provisional Patent Application No. 63/091,488, filed Oct. 14, 2020, the entire contents of each of which being incorporated herein by reference as if fully set forth below in their entirety.

BACKGROUND

A first version of New Radio (NR) sidelink focuses on supporting Vehicle-to-Everything (V2X) related road safety services. The design aims to provide support for broadcast, groupcast and unicast communications in both out-of-coverage and in-network coverage scenarios. On top of that, sidelink-based relaying functionality may provide sidelink/network coverage extension and power efficiency improvement, considering wider range of applications and services.

Coverage extension for sidelink-based communication may be improved, related to WTRU-to-network coverage extension and WTRU-to-WTRU coverage extension (WTRU stands for wireless transmit/receive unit).

Overall sidelink connectivity may be further extended in the NR framework, in order to support enhanced QoS requirements.

SUMMARY

The methods and apparatuses described herein may determine whether an inactive relay WTRU may serve a network initiated connection at a remote WTRU based on the coverage status of the remote WTRU, on a Channel Busy Ratio (CBR), and on access control decision made by the network. Such method may be implemented by the relay WTRU and may comprise: receiving an In-Coverage (IC) indication from the remote WTRU, indicating that the remote WTRU is IC of a suitable cell; receiving a paging message intended for a remote WTRU of a set of remote WTRUs handled by the relay WTRU; and on condition that the CBR is above a threshold, forwarding the paging message on Sidelink and indicating to the remote WTRU to trigger an RRC connection via Uu.

Further methods and apparatuses are described herein for radio resource control connection. The methods may, for example, be achieved through methods for use in a wireless transmit/receive unit (WTRU) and may include a method in a WTRU for resuming a Radio Resource Control (RRC) connection with a network, when the WTRU is connected to a relay WTRU via a PC5-RRC connection, and has an active Uu RRC connection with the network via the relay. The method may include detecting a Sidelink Radio Link Failure (SL-RLF) with the relay WTRU, performing cell reselection to select a suitable cell, and on condition that the selected cell is the same as the cell to which the relay WTRU was connected, performing a Random Access Channel (RACH) procedure, and providing a Packet Data Convergence Protocol (PDCP) status report in the data part of the RACH.

A study on NR sidelink relay may cover the use of both WTRU to network relays and WTRU to WTRU relays based on PC5 (sidelink). PC5 refers to a reference point where the WTRU directly communicates with another WTRU over the direct channel. In this case, the communication with the base station is not required. Specifically, based on study item justification/objectives, a first version of NR sidelink solely focuses on supporting V2X related road safety services. The design aims to provide support for broadcast, groupcast and unicast communications in both out-of-coverage and in-network coverage scenarios. On top of that, sidelink-based relaying functionality may be additionally studied in order for sidelink/network coverage extension and power efficiency improvement, considering wider range of applications and services.

To further explore coverage extension for sidelink-based communication, WTRU-to-network coverage extension and WTRU-to-WTRU coverage extension may be improved.

For WTRU-to-network coverage extension, Uu coverage reachability is necessary for WTRUs to reach server in PDN network or counterpart WTRU out of proximity area. However, existing solutions on WTRU-to-network relay is limited to EUTRA-based technology (E-UTRA is the air interface of 3GPP LTE upgrade path for mobile networks. It is an acronym for Evolved Universal Mobile Telecommunications System (UMTS) Terrestrial Radio Access, also referred to as the 3GPP work item on the Long Term Evolution (LTE) also known as the Evolved Universal Terrestrial Radio Access (E-UTRA) in early drafts of the 3GPP LTE specification), and thus cannot be applied to NR-based system, for both NG-RAN and NR-based sidelink communication.

For WTRU-to-WTRU coverage extension: currently, proximity reachability is limited to single-hop sidelink link, either via EUTRA-based or NR-based sidelink technology. However, that may be not sufficient in the scenario where there is no Uu coverage, considering the limited single-hop sidelink coverage.

Overall, sidelink connectivity may be further extended in NR framework, for example to support the enhanced QoS requirements.

The following mechanisms for Single hop NR sidelink relays may, among others, be explored:

1. Mechanism(s) with minimum specification impact to support the SA requirements for sidelink-based WTRU-to-network and WTRU-to-WTRU relay, focusing on the following aspects (if applicable) for layer-3 relay and layer-2 relay:
   Relay (re-)selection criterion and procedure;
   Relay/Remote WTRU authorization;
   QoS for relaying functionality;
   Service continuity;
   Security of relayed connection after the working group called SA3, responsible in 3GPP for the security aspect, has provided its conclusions;
   Impact on user plane protocol stack and control plane procedure, e.g., connection management of relayed connection.
2. Mechanism(s) to support upper layer operations of discovery model/procedure for sidelink relaying, assuming no new physical layer channel/signal.

WTRU to Network Relays

Relaying via Proximity based Services (ProSe) WTRU to Network relays was introduced to extend network coverage to an out of coverage WTRU by using PC5 (Device-to-Device communication, D2D) between an out of coverage WTRU and a WTRU-to-Network relay.

A ProSe WTRU-to-Network Relay provides a generic L3 forwarding function that can relay any type of IP traffic between the Remote WTRU and the network. One-to-one and one-to-many sidelink communications may be used between the Remote WTRU(s) and the ProSe WTRU-to-Network Relay. For both Remote WTRU and Relay WTRU only one single carrier (i.e., Public Safety ProSe Carrier) operation may be supported (i.e., Uu and PC5 should be same carrier for Relay/Remote WTRU). The Remote WTRU may be authorized by upper layers and may be in-coverage of the Public Safety ProSe Carrier or out-of-coverage on any supported carriers including Public Safety ProSe Carrier for WTRU-to-Network Relay discovery, (re) selection and communication. The ProSe WTRU-to-Network Relay is always in-coverage of EUTRAN (E-UTRAN is the initialism of Evolved UMTS Terrestrial Radio Access Network and is the combination of E-UTRA, user equipment (UE), and E-UTRAN Node B or Evolved Node B (eNB).). The ProSe WTRU-to-Network Relay and the Remote WTRU may perform sidelink communication and sidelink discovery.

Relay Selection for WTRU to NW Relays

Throughout the following, the terms RRC_INACTIVE state/inactive, RRC_ACTIVE state/active, RRC_IDLE/idle, RRC_CONNECTED/connected, are used interchangeably, and may mean a state of a device. The Radio Resource Control (RRC) protocol is used in UMTS, LTE and 5G on the Air interface (Uu). It is a layer 3 (Network Layer) protocol used between WTRU and Base Station. This protocol is specified by 3GPP for UMTS, for LTE and for 5G New Radio. RRC messages may be transported via the PDCP-Protocol. An air interface is the radio frequency portion of the circuit between the WTRU and a (active) base station.

The major functions of the RRC protocol include connection establishment and release functions, broadcast of system information, radio bearer establishment, reconfiguration and release, RRC connection mobility procedures, paging notification and release and outer loop power control. By means of the signalling functions the RRC configures the user and control planes according to the network status and allows for Radio Resource Management strategies to be implemented.

The operation of the RRC may be guided by a state machine which may define certain states that a WTRU may be in. The different states in this state machine may have different amounts of radio resources associated with them and these are the resources that the WTRU may use when it is present in a given specific state. Since different amounts of resources are available at different states the quality of the service that the user experiences and the energy consumption of the WTRU are influenced by this state machine. A WTRU may, for example, be either in RRC_CONNECTED state/connected or in RRC_INACTIVE state/inactive when an RRC connection has been established. If this is not the case, i.e., no RRC connection is established, the WTRU may be, for example, in RRC_IDLE state/idle.

Relay selection/reselection for ProSe WTRU to NW relays may be performed based on combination of a AS layer quality measurements (RSRP) and upper layer criteria, as follows:

The eNB may control whether the WTRU may act as a ProSe WTRU-to-Network Relay:

If the eNB broadcast any information associated to ProSe WTRU-to-Network Relay operation, then ProSe WTRU-to-Network Relay operation may be supported in the cell;

The eNB may provide:

Transmission resources for ProSe WTRU-to-Network Relay discovery using broadcast signalling for RRC_IDLE state and dedicated signalling for RRC_CONNECTED state;

Reception resources for ProSe WTRU-to-Network Relay discovery using broadcast signalling;

The eNB may broadcasts a minimum and/or a maximum Uu link quality (RSRP) threshold(s) that the ProSe WTRU-to-Network Relay needs to respect before it can initiate a WTRU-to-Network Relay discovery procedure. In RRC_IDLE, when the eNB broadcasts transmission resource pools, the WTRU may use the threshold(s) to autonomously start or stop the WTRU-to-Network Relay discovery procedure. In RRC_CONNECTED, the WTRU may use the threshold(s) to determine if it can indicate to eNB that it is a Relay WTRU and wants to start ProSe WTRU-to-Network Relay discovery;

If the eNB does not broadcast transmission resource pools for ProSe-WTRU-to-Network Relay discovery, then a WTRU may initiate a request for ProSe-WTRU-to-Network Relay discovery resources by dedicated signalling, respecting these broadcasted threshold(s).

If the ProSe-WTRU-to-Network Relay is initiated by broadcast signalling, it may perform ProSe WTRU-to-Network Relay discovery when in RRC_IDLE. If the ProSe WTRU-to-Network Relay is initiated by dedicated signalling, it may perform relay discovery as long as it is in RRC_CONNECTED.

A ProSe WTRU-to-Network Relay performing sidelink communication for ProSe WTRU-to-Network Relay operation is in RRC_CONNECTED. After receiving a layer-2 link establishment request or TMGI monitoring request (upper layer message) from the Remote WTRU, the ProSe WTRU-to-Network Relay may indicate to the eNB that it is a ProSe WTRU-to-Network Relay and intends to perform ProSe WTRU-to-Network Relay sidelink communication. The CNB may provide resources for ProSe WTRU-to-Network Relay communication.

The remote WTRU may decide when to start monitoring for ProSe WTRU-to-Network Relay discovery. The Remote WTRU may transmit ProSe WTRU-to-Network Relay discovery solicitation messages while in RRC_IDLE or in RRC_CONNECTED depending on the configuration of resources for ProSe WTRU-to-Network Relay discovery. The eNB may broadcast a threshold, which may be used by the Remote WTRU to determine if it may transmit ProSe WTRU-to-Network Relay discovery solicitation messages, to connect or communicate with ProSe WTRU-to-Network Relay WTRU. The RRC_CONNECTED Remote WTRU, uses the broadcasted threshold to determine if it may indicate to eNB that it is a Remote WTRU and wants to participate in ProSe WTRU-to-Network Relay discovery and/or communication. The CNB may provide, transmission resources using broadcast or dedicated signalling and reception resources using broadcast signalling for ProSe WTRU-to-Network Relay Operation. The Remote WTRU may stop using ProSe WTRU-to-Network Relay discovery and communication resources when RSRP goes above the broadcasted threshold.

Exact time of traffic switching from Uu to PC5 or vice versa is up to higher layer.

The Remote WTRU may perform radio measurements at PC5 interface and may use them for ProSe WTRU-to-Network Relay selection and reselection along with higher layer criterion [62]. A ProSe WTRU-to-Network Relay may be considered suitable in terms of radio criteria if the PC5 link quality exceeds configured threshold (pre-configured or provided by eNB). The Remote WTRU may select the ProSe WTRU-to-Network Relay, which satisfies higher layer criterion and has best PC5 link quality among all suitable ProSe WTRU-to-Network Relays.

The Remote UE may trigger ProSe WTRU-to-Network Relay reselection when:

PC5 signal strength of current ProSe UE-to-Network Relay is below configured signal strength threshold;
 It receives a layer-2 link release message (upper layer message) from ProSe UE-to-Network Relay.

WTRU to Network Relays for Wearables

A study for WRTUs to NW relays for commercial use cases tailored to wearables and IoT devices was performed in RAN. While such study did not result in any specification, a technical report (TR) provided some preferred solutions for such relays. Contrary to ProSe WTRU to NW relays which uses a L3 (IP layer) relaying approach, the WTRU to NW relays for wearables was expected to be a L2 relay based on the protocol stacks shown in FIG. 2, which represents a User plane radio protocol stack for layer 2 evolved WTRU-to-Network relay (PC5), and FIG. 3, which represents a Control plane radio protocol stack for layer 2 evolved WTRU-to-Network relay (PC5).

Connection Establishment for Unicast Links in NR V2X

Relay solutions in previous releases of the LTE specification were based on a one to one communication link established at upper layers (ProSe layer) between two WTRUs (the remote WTRU and WTRU to NW relay). Such connection was transparent to the AS layer and connection management signaling and procedures performed at the upper layers are carried by AS layer data channels. The AS layer is therefore unaware of such a one to one connection.

In NR V2X release 16, the AS layer supports the notion of a unicast link between two WTRUs. Such unicast link is initiated by upper layers (as in the ProSe one-to-one connection). However, the AS layer is informed of the presence of such unicast link, and any data that is transmitted in unicast fashion between the peer WTRUs. With such knowledge, the AS layer can support HARQ feedback, CQI feedback, and power control schemes which are specific to unicast.

A unicast link at the AS layer is supported via a PC5-RRC connection. The PC5-RRC connection is defined as follows:

The PC5-RRC connection is a logical connection between a pair of a Source Layer-2 ID and a Destination Layer-2 ID in the AS. One PC5-RRC connection is corresponding to one PC5 unicast link. The PC5-RRC signalling, can be initiated after its corresponding PC5 unicast link establishment. The PC5-RRC connection and the corresponding sidelink SRBs and sidelink DRBs are released when the PC5 unicast link is released as indicated by upper layers.

For each PC5-RRC connection of unicast, one sidelink SRB is used to transmit the PC5-S messages before the PC5-S security has been established. One sidelink SRB is used to transmit the PC5-S messages to establish the PC5-S security. One sidelink SRB is used to transmit the PC5-S messages after the PC5-S security has been established, which is protected. One sidelink SRB is used to transmit the PC5-RRC signalling, which is protected and only sent after the PC5-S security has been established.

PC5-RRC signaling includes a sidelink configuration message (RRCReconfigurationSidelink) where one WTRU configures the RX-related parameters of each Sidelink Radio Bearer (SLRB) in the peer WTRU. Such reconfiguration message can configure the parameters of each protocol in the L2 stack (Service Data Adaptation Protocol (SDAP), Packet Data Convergence Protocol (PDCP), etc). The receiving WTRU can confirm or reject such configuration, depending on whether it can support the configuration suggested by the peer WTRU.

BRIEF DESCRIPTION OF THE DRAWINGS

A more detailed understanding may be had from the detailed description below, given by way of example in conjunction with drawings appended hereto. Figures in the description are examples. As such, the figures and the detailed description are not to be considered limiting, and other equally effective examples are possible and likely. Furthermore, like reference numerals in the figures indicate like elements, and wherein.

DETAILED DESCRIPTION

Example Networks for Implementation of the Embodiments

Figure 1A:
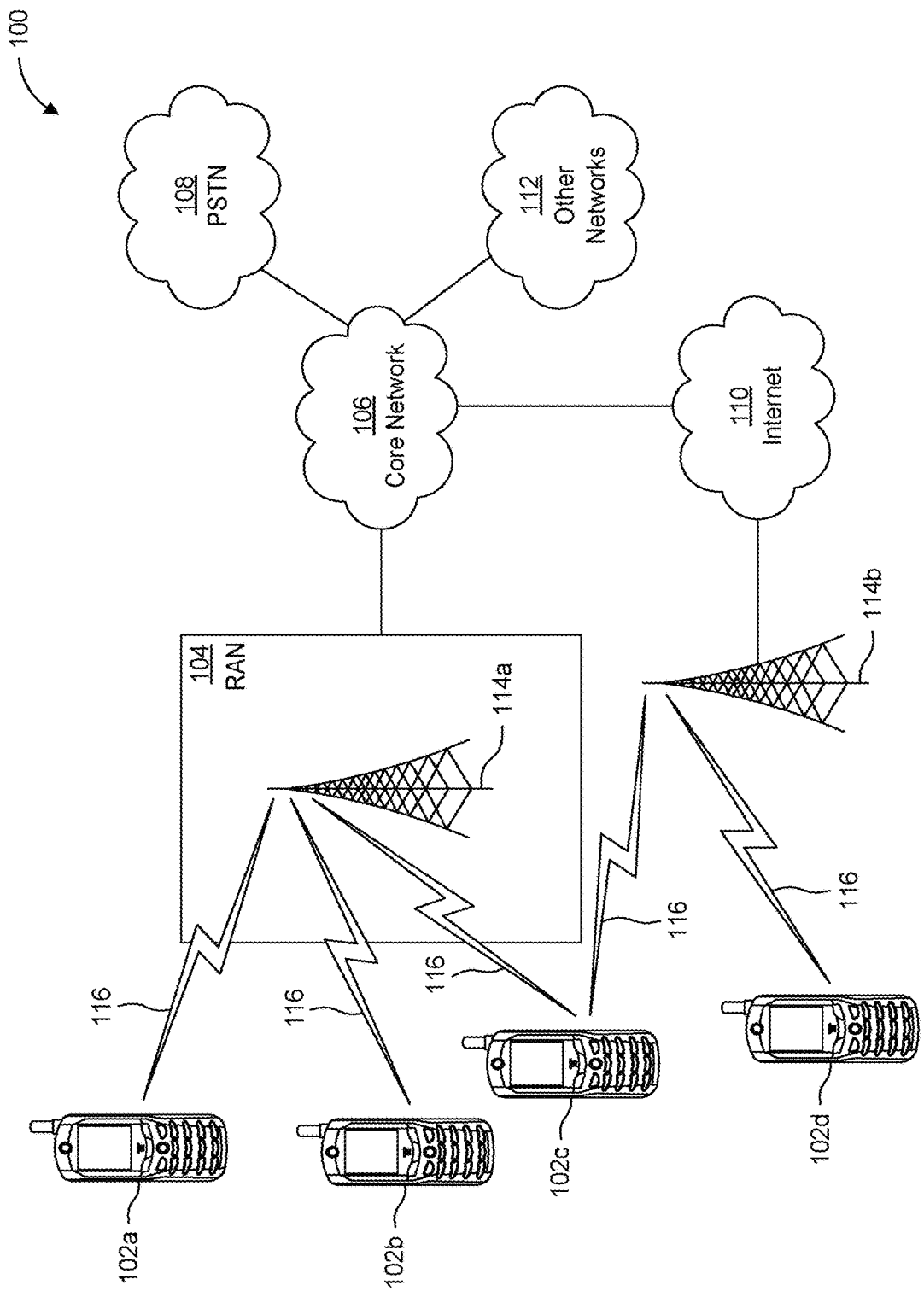
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
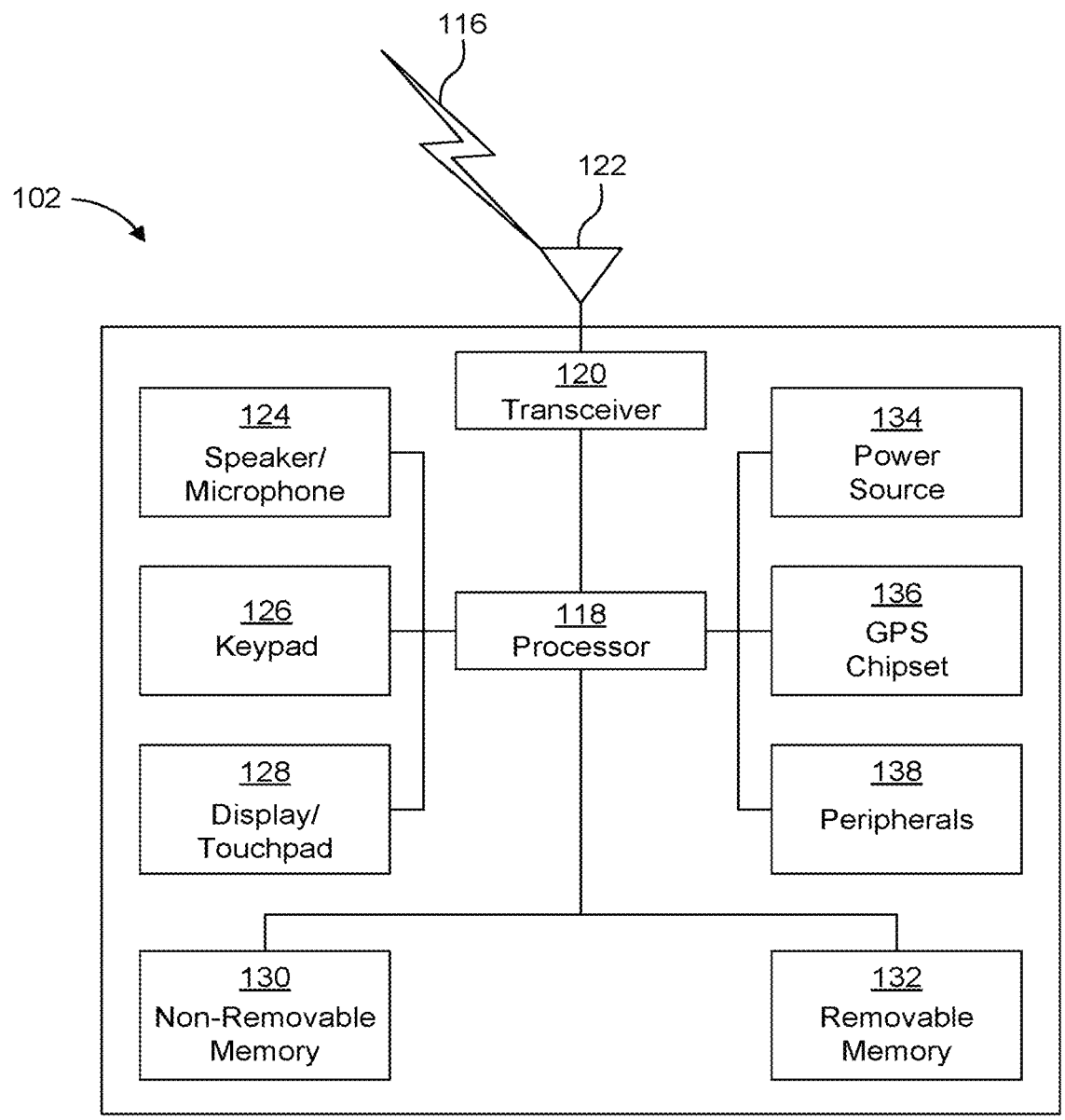
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
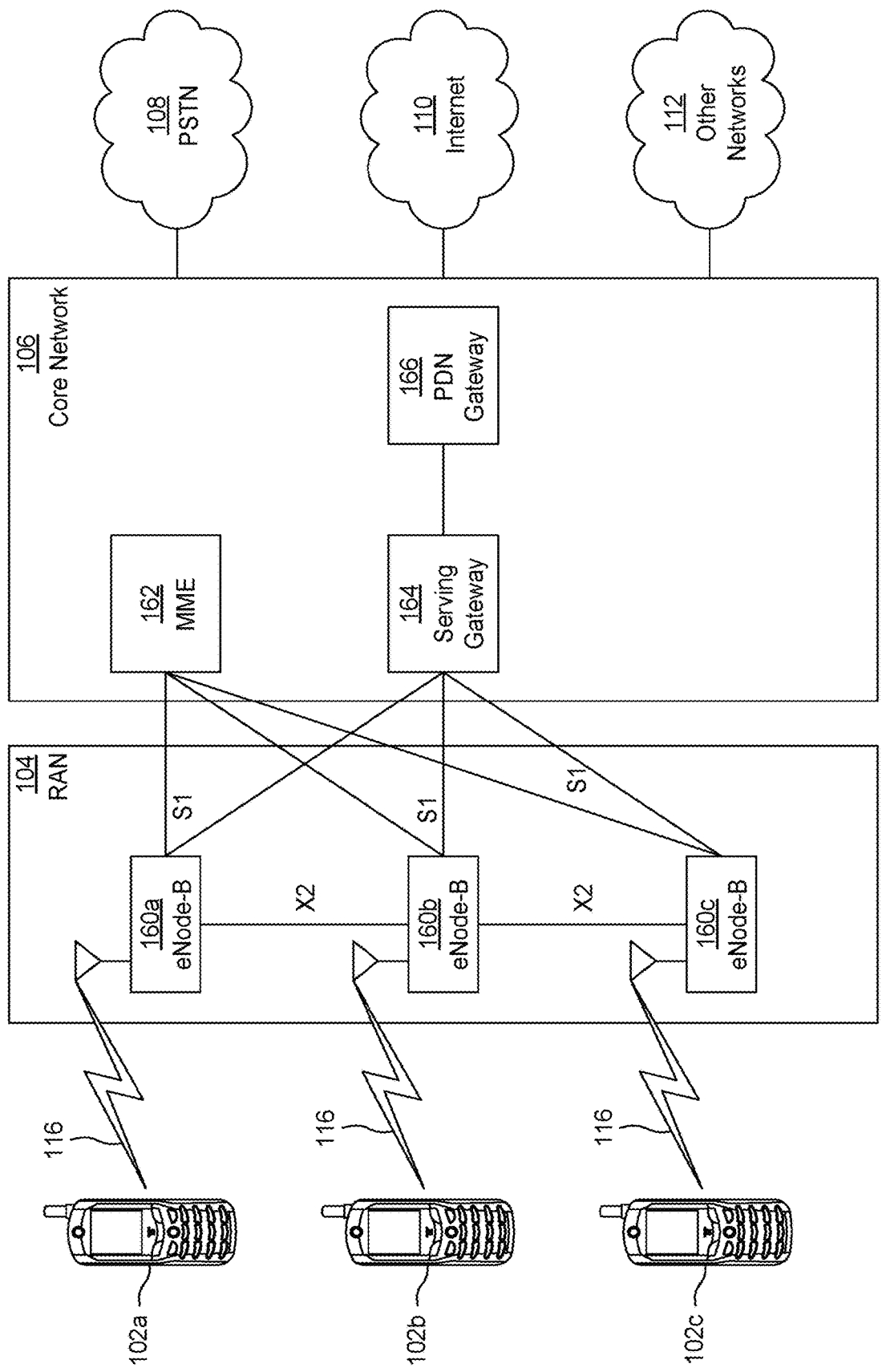
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHz, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
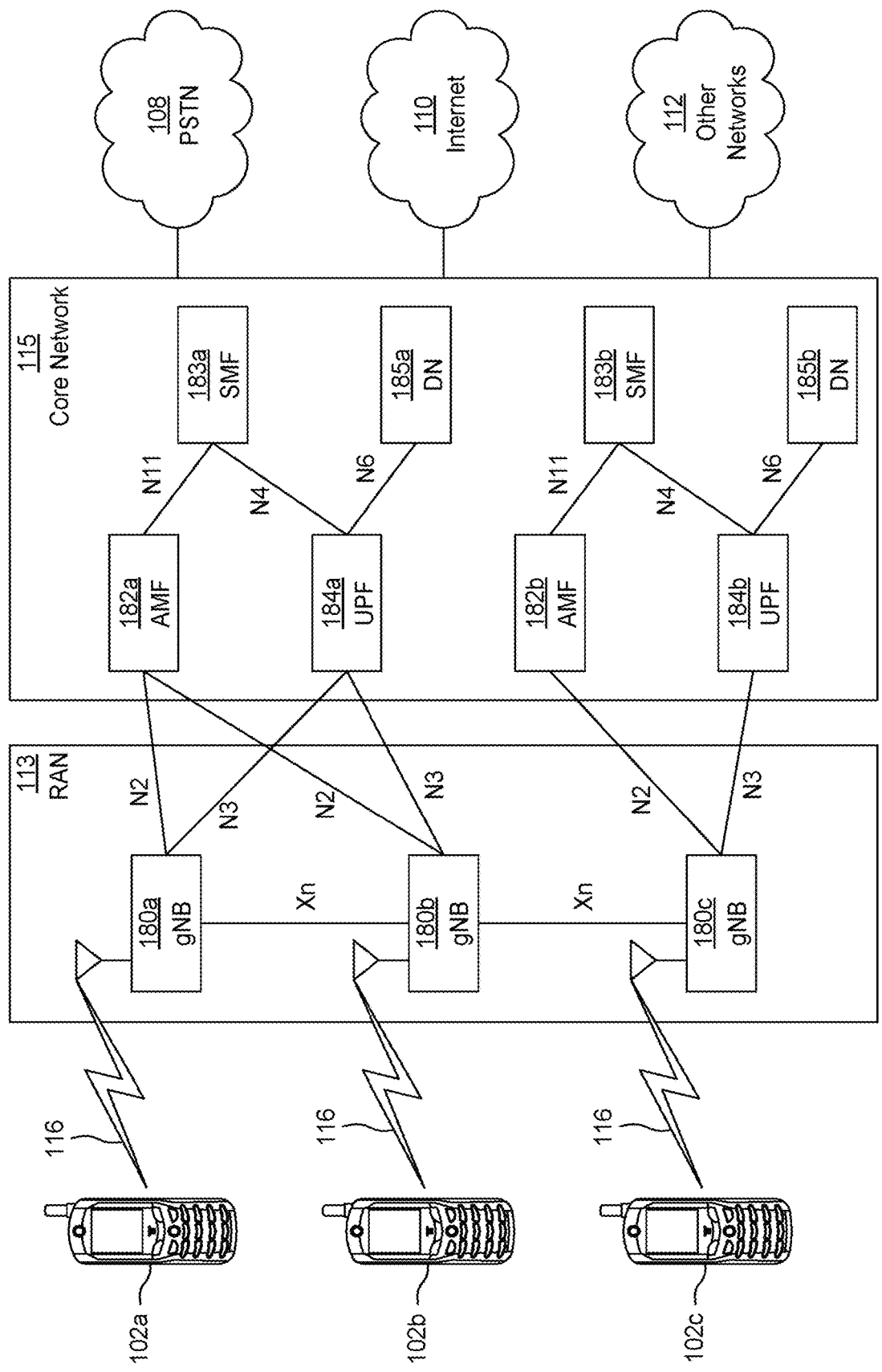
FIG. 1D is a system diagram illustrating a further example RAN and a further example CN that may be used within the communications system illustrated in FIG. 1A according to an embodiment.
Figure 2:
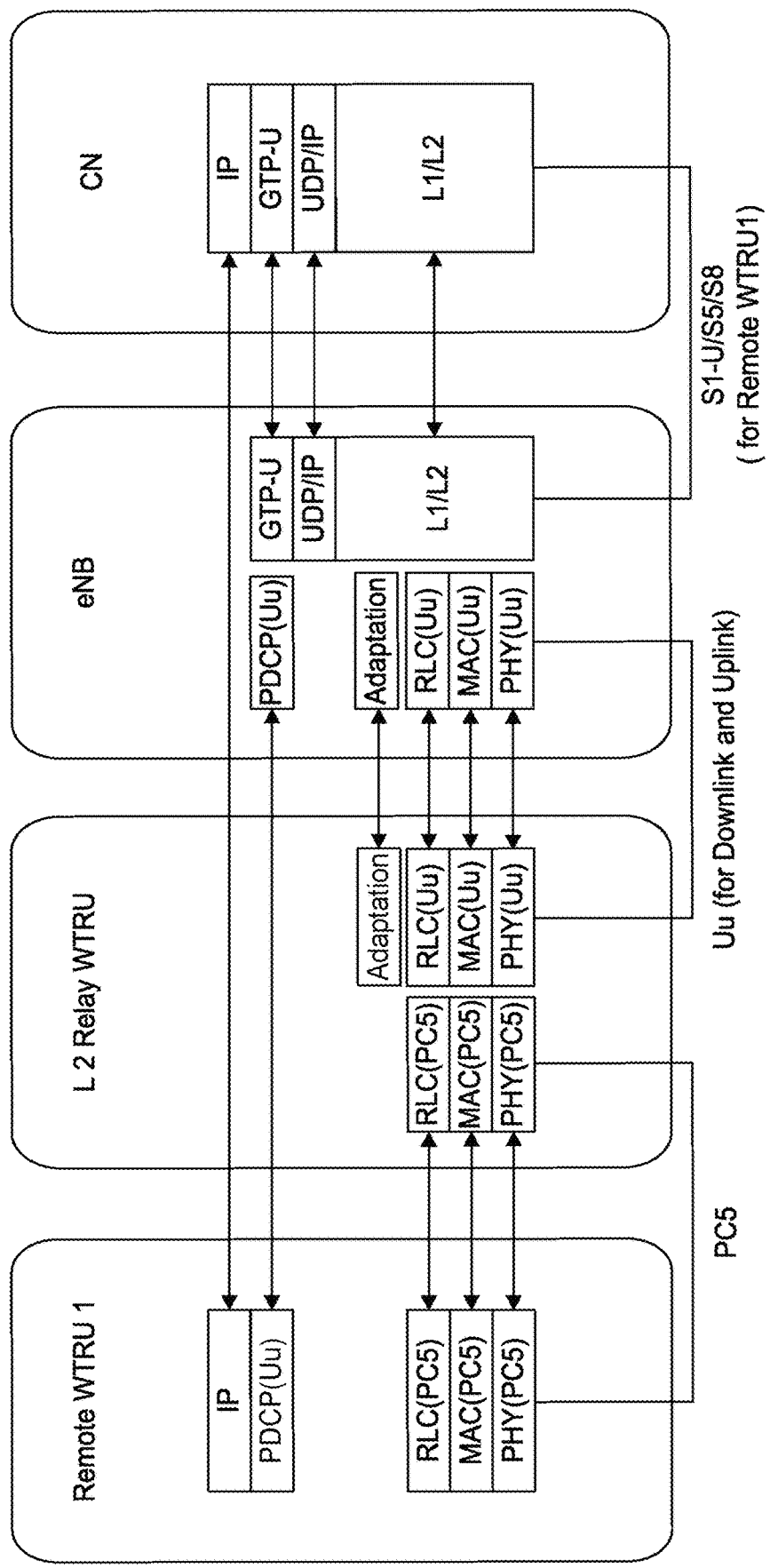
FIG. 2 is a User plane radio protocol stack for layer 2 evolved WTRU-to-Network relay (PC5).
Figure 3:
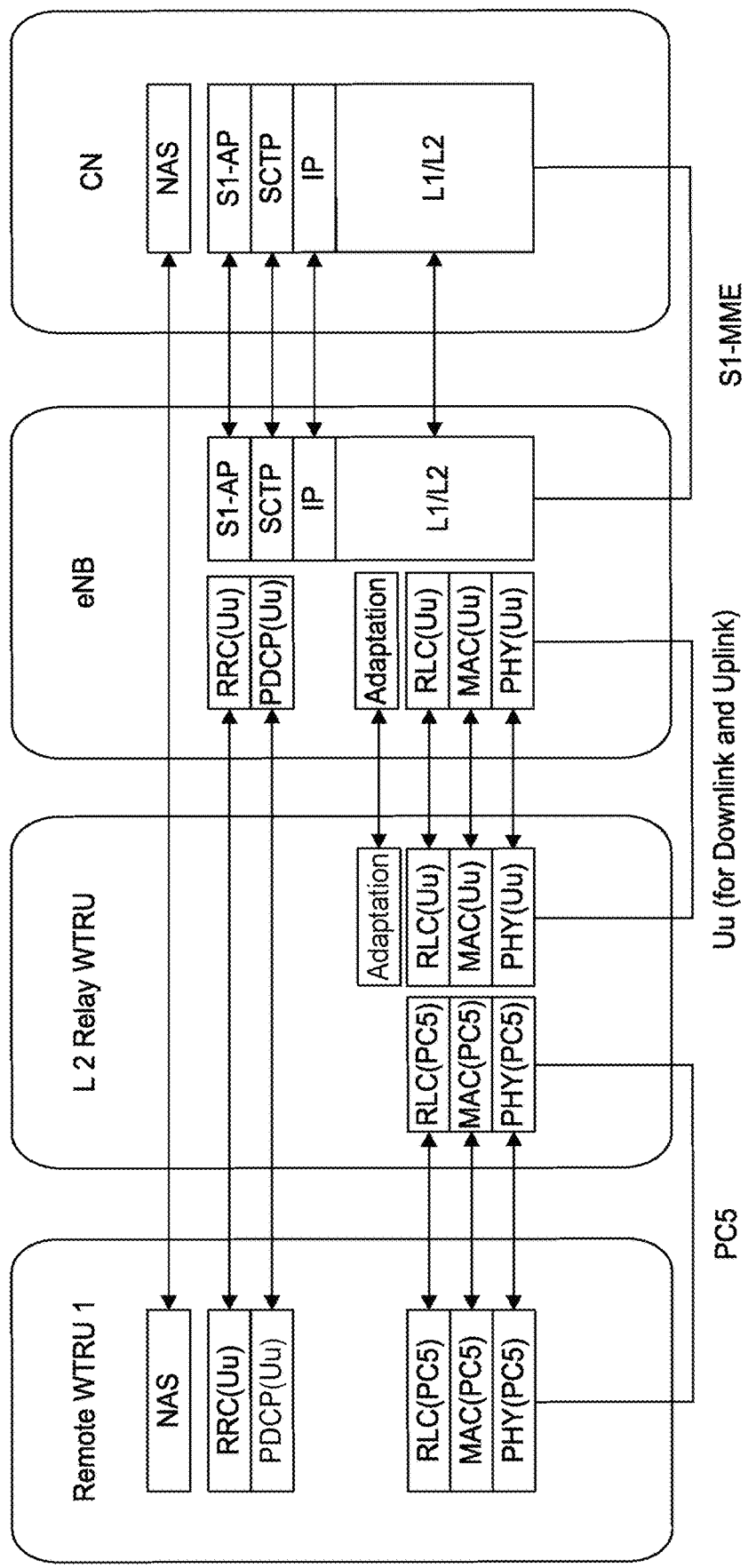
FIG. 3 is a Control plane radio protocol stack for layer 2 evolved WTRU-to-Network relay (PC5).

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Efficient Use of Sidelink and Reachability of the Remote WTRU, and Detection of Link Problems For an L2 relay, a remote WTRU may initiate an RRC connection using Uu connection establishment signaling relayed via the WTRU to NW relay. Once PC5-RRC connected to the relay, a remote WTRU may also perform similar state transitions with the network as it would perform if it were connected directly via Uu.

Before and during this PC5-RRC connected state, however, a number of procedures at the remote/relay WTRU may need to be put in place to ensure efficient use of sidelink and reachability of the remote WTRU. Specifically, a remote WTRU may experience a lack of Uu traffic. Under such condition, it should remain reachable by the network without having to consume power to monitor sidelink for any relayed traffic. Embodiments described here relate to modeling of IDLE/INACTIVE at the WTRU when connected to a relay, and behavior of the relay/remote WTRU with respect to its RRC state in the case of mobility with respect to the sidelink is addressed in the following according to embodiments. Further embodiments described here relate to how, additionally, the remote WTRU receives paging, or accesses system information in each of its Uu states (as well as prior to connection with the relay WTRU).

Also, a PC5-RRC connection may undergo a link problem (e.g. PC5-RRC), and such link problem may be detected by either of the relay or remote WTRUs. Embodiments are described here that relate to detecting this link problem and informing either the network or the other WTRU in a timely matter is important to avoid inefficient operation of the relay and remote WTRUs.

Methods for Control Plane Handling/Access Via WTRU to NW Relays

Paging and DRX on SL for a WTRU in RRC_IDLE/RRC_INACTIVE

Remote/Relay WTRU Informs the Network of its Connected Relay/Remote WTRU

Methods may be needed for the network to be aware of the relay WTRUs PC5-RRC connected remote WTRUs. Such methods may involve a relay WTRU informing the network of a connected remote WTRU, or a remote WTRU which is no longer connected. Alternatively, a remote WTRU may inform the network of its connected relay WTRU. A relay/remote WTRU may send a message to the network upon any of the following:

A remote WTRU may provide the network the ID of the relay/remote (e.g. L2 ID):
  a. Upon transition to RRC_CONNECTED by the remote/relay WTRU;
  b. Upon establishment of a PC5-RRC connection with a (possibly another/new) relay/remote WTRU;
  c. Upon triggering a RAN area update.

A relay WTRU may inform the network of the number of PC5-connected remote WTRUs and/or whether there is at least one PC5-RRC connected remote WTRUs and/or the IDs of the connected remote UEs:
  a. Following a request from the network;
  b. Following a change of the number of PC5-RRC connected WTRUs;
  c. At the detection of a SL RLF with one of the remote PC5-connected WTRUs;
  d. Following establishment of a PC5-RRC connection with the first or any remote WTRU;
  e. When no more remote WTRUs are PC5-RRC connected to the relay WTRU;
  f. During a RAN area update by the relay WTRU (e.g. in the RRCResume message);
  g. Following a HO by the remote WTRU (e.g. the RRCReconfigurationComplete).

Remote/Relay WTRU informs the Network of its Connected Relay/Remote WTRU

According to an embodiment, a remote WTRU may inform a relay WTRU of its Uu coverage situation. For example, a remote WTRU may transmit a PC5-RRC message to its PC5-RRC connected relay WTRU when the remote WTRU's coverage situation changes (i.e. it moves from in-coverage to out of coverage or vice versa) and the remote WTRU may inform the relay WTRU of whether it is in coverage or out of coverage. In coverage or out of coverage may be defined as whether the remote WTRU has a suitable cell which it can select on Uu. A remote WTRU may further inform a relay WTRU of cell to which the remote WTRU is in coverage of.

RRC Connection Release May Implicitly/Explicitly Release all Remote WTRUS

According to an embodiment, a relay WTRU may receive a release message (release to IDLE or release to INACTIVE) which implicitly/explicitly releases each of the remote WTRUs PC5-RRC connection. For example, a relay WTRU may release all PC5-RRC connections upon reception of a release message, possibly containing an explicit indication to perform such release.

According to an embodiment, a relay WTRU may receive a release message (release to IDLE or release to INACTIVE) which implicitly/explicitly releases each of the remote WTRUs Uu connections. Specifically, a relay WTRU may receive a release to RRC_INACTIVE/RRC_IDLE, possibly including a release indication. Upon reception of such release, the relay WTRU may transmit a message on PC5 to indicate to one or more remote WTRUs to release their own Uu RRC connections. A relay WTRU may further indicate the RRC state (e.g. RRC_IDLE or RRC_INACTIVE) that the remote WTRU should transition to. A remote WTRU, upon reception of such PC5-RRC message from the relay WTRU, may move to RRC_IDLE/RRC_INACTIVE or the state indicated in such message.

Remote WTRU Transitions to SL DRX while in Uu RRC IDLE/INACTIVE

A remote WTRU connected to the network via a WTRU to NW relay may operate in different RRC states (with the network) while having an active PC5 connection. In one solution, a remote WTRU may perform SL DRX when it transitions to Uu RRC IDLE/RRC_INACTIVE. Such SL DRX at the remote WTRU may consist of monitoring a subset (in time/frequency) of the RX resource pool. Such SL DRX at the remote WTRU may consist of monitoring a different RX resource pool from the RX resource pool that is configured when the WTRU is not in SL DRX. Specifically, a remote WTRU may initiate SL DRX when it receives a Uu release RRC message from the network (sending the WTRU to RRC_INACTIVE/RRC_IDLE). Specifically, a remote WTRU may initiate SL DRX upon expiry of a Uu inactivity timer.

Remote WTRU Transitions Out of SL DRX while in RRC_IDLE/RRC_INACTIVE

A remote WTRU may transition out of SL DRX (i.e. initiate monitoring SL outside of its defined DRX on periods) under any of the following conditions:

Condition related to the quality of the attached SL relay: Specifically, a remote WTRU may monitor the SL quality of the current relay WTRU while in DRX (e.g. by measuring the RSRP of a discovery message or similar periodic message transmitted by the relay WTRU). If the quality falls below a threshold, the remote WTRU may transition out of DRX. Specifically, the remote WTRU may initiate relay discovery/monitoring with other relay WTRUs aside from the currently connected remote WTRU.

Conditions related to a change in system information: Specifically, a remote WTRU may determine whether system information has changed (e.g. based on indication from a remote WTRU). In the case where system information has changed, a remote WTRU may transition out of DRX to acquire new system information.

Based on explicit indication by the relay WTRU or the network: Specifically, a relay WTRU may inform the remote WTRU(s) that it has transmissions on SL which will fall outside of the DRX on period.

Relay WTRU Indicates in the SL Paging Message Whether to Initiate Uu Connection Directly or Via Relay A relay WTRU may receive paging message for each of its multiple remote WTRUs. The relay WTRU may extract, from the Uu paging message, the paging record associated with only the WTRUs which are associated with it (i.e. the remote WTRUs to which it has a PC5-RRC connection). The relay WTRU may include one or multiple such paging record within a SL message.

In addition to the Uu paging record, a relay WTRU may send the following information on the SL paging message:

Indication/command/preference indicating whether the remote WTRU should initiate the Uu connection directly on Uu or via the SL relay
  a. The relay WTRU may determine the value of such indication based on response from the network
    i. For example, the network may explicitly include a preference (Uu or relayed) in the paging message to the remote WTRU and the relay WTRU may read such explicit indication when receiving the paging from the remote WTRU
    ii. For example, the relay WTRU may determine the value of such indication from the result of a resume procedure to the network. For example, if the resume procedure to the network fails at the remote WTRU (i.e. release/reject), the relay may indicate to the to the remote WTRU to perform the connection via Uu.
  b. The relay WTRU may determine the value of such indication based on the Channel Busy Ratio (CBR):
    i. For example, if the measured CBR at the relay WTRU is above a threshold, and (possibly) the relay is aware that the remote WTRU is IC, the relay may indicate to the remote WTRU to initiate the connection via Uu
  c. The relay WTRU may determine the value of such indication based on the coverage situation of the remote WTRU:
    i. For example, the remote WTRU may send a message to the relay WTRU to provide the coverage situation at the remote WTRU (e.g. in coverage or out of coverage of a suitable cell). Such message may be sent by the remote WTRU each time there is a change in the coverage situation. If the relay WTRU is aware that the remote WTRU is in coverage of a suitable cell, the relay WTRU may determine (e.g. based on other factors) to send an indication for the remote WTRU to connect via Uu When a remote WTRU receives the paging message along with such indication, the remote WTRU may determine whether to initiate the RRC connection via Uu or via the relay based on the value of such indication, and possibly also:
  i. Measured CBR;
  ii. The access class of the remote WTRU;
  iii. A priority indication in the paging message.

Arrival of Paging Message for One or More Remote WTRUs Triggers Resource Allocation Actions at the Relay WTRU A relay WTRU may trigger one or more of the following actions related to resource allocation upon reception, by the relay WTRU, of a Uu paging message having at least one paging record for a remote WTRU that is PC5-RRC connected to the relay:

Trigger RRC connection/resume:
  a. The connection/resume may indicate a cause value that informs the network that
    i. One of the remote WTRUs received a paging message from the network;
    ii. The remote WTRU that received a paging message from the network was in coverage or out of coverage.
  b. A relay in RRC_IDLE/RRC_INACTIVE may trigger an RRC connection/resume upon reception of a paging message destined for one or more of its attached remote WTRUs. The remote WTRU may indicate (e.g. in a connection cause, an additional RRC message, or within the data portion of a two-step Random Access Channel (RACH)) that the connection/resume is for the purposes of.
  c. A relay WTRU may receive, within the messaging associated with the resume procedure (e.g. in the resume message, or a subsequent RRC reconfiguration message) a SL grant for transmission of the paging message to the remote WTRUs. The relay WTRU may determine, in case where it receives such allocation, to not transmit an SR once it resumes the RRC connection.

Trigger SR
  a. A relay WTRU configured in mode 1 may transmit an SR upon reception of a paging message addressed to one of its connected remote WTRUs. Specifically, a relay WTRU may be configured with one or more dedicated SR configurations for use when receiving a paging message destined to a remote WTRU.
  b. A relay WTRU may be configured with multiple SR configurations, where each SR configuration may be associated with any of the following:
    i. The number of connected remote WTRUs. For example, a remote WTRU may be configured with an SR configuration associated with a number or range of connected remote WTRUs, and may select the corresponding SR configuration based on the number of connected remote WTRUs
    ii. The number of remote WTRUs that were paged, in one or more time slots or within a period of time: For example, a remote WTRU may be configured with an SR configuration associated with a number of remote WTRUs which were paged over a period of time (e.g. over the previous SL DRX cycle).

Trigger a SL resource (re)selection
  a. A relay WTRU configured in mode 2 may trigger a SL resource selection procedure upon reception of a Uu paging message associated with one or more of its attached remote WTRUs. Alternatively, a relay WTRU may trigger a SL resource selection procedure at a predefined time (e.g. end of a DRX cycle) if it received at least one paging message destined to one or more remote WTRUs over a given time period (e.g. the last DRX cycle)

Trigger a 2-step/4-step RACH for transmission of a SL resource request
  a. A relay WTRU in RRC_INACTIVE may send a SL resource request within a 2-step or 4-step RACH procedure. Such SL resource request may be for the purposes of sending a SL paging message. A WTRU may trigger such 2-step/4-step RACH procedure upon reception of a Uu paging message for one or more of the connected remote WTRUs. Alternatively, such may be triggered at some pre-configured period of time (e.g. the beginning/end of a Uu or SL DRX cycle) whereby at least one paging message for a remote WTRU was received within such time period
  b. A relay WTRU may receive the SL resource allocation in a subsequent downlink transmission (in 2-step/4-step RACH procedure, or subsequent to it). Such subsequent downlink grant can be of a (pre) configured SL grant size. Alternatively, the SL grant size may be a function of:
    a. The number of WTRU paging records for attached remote WTRUs received in the paging occasion(s) previous to the SL resource request;
    b. An indication in the request (2-step/4-step RACH), of the number of paging records, and or index to a table of requested grant sizes.
  Such downlink grant may assume (pre)configured parameters related to the time/frequency resources. The DL message may provide an index of a resource offset from a (pre)configured or predefined resource. For example, the DL message may contain an index representing an offset from:
    a. the paging occasion of the remote WTRU;
    b. the paging occasion of the relay WTRU;
    c. a preconfigured time slot (e.g. provided in system information).

Implicitly trigger a change in the transmission mode (e.g. mode 2 to mode 1 or vice versa) at the relay WTRU Trigger transmission on predefined or (pre)configured sidelink resource and/or implicitly allocate a sidelink resource
  a. For example, a relay WTRU may perform transmission (e.g. of the Uu paging message) on a SL resource that is preconfigured for such transmission (e.g. a configured grant reserved for SL paging transmission)
  b. For example, a relay WTRU may determine a SL resource allocation implicitly from the reception of a paging message for one or more of its attached remote WTRUs. Specifically, such reception of a paging message can be assumed to allocate SL resources to the relay WTRU for transmission of the paging message. A relay WTRU can determine the time/frequency resources for the SL resource to use for transmission of the paging message based on:
    i. A fixed/(pre)configured offset in time from the reception of the Uu paging message
    ii. Any contents of the paging message (e.g. a resource index, offset, etc.)
    iii. The number of remote WTRUs paged, possibly over a given time or in a given slot A WTRU May be Configured with Conditions to Decide What Resource Allocation Action to Take Following Reception of a Remote WTRU Paging According to an embodiment, a relay WTRU may determine which of the above actions to perform (or whether to perform the above actions) based on one or more conditions associated with the sidelink/relay connection. Specifically, a relay WTRU may be configured to perform a first action if a first condition below is satisfied, and perform a second action if a second condition below is not satisfied. Alternatively, a relay WTRU may perform a first action if a condition is satisfied, and not perform any action if the condition is not satisfied. A relay WTRU may determine whether/which of the above resource allocation actions to perform based on any or a combination of:

The measured CBR, possibly compared to a threshold
  The contents of the paging message
    a. For example, the paging message contains an access class or access type
    b. For example, the paging message contains a high priority indication, or based on a priority value provided in the paging message
  The type of RLC bearers, or the configuration of the RLC bearers at the relay WTRU and associated with the remote WTRU
    a. For example, an RLC bearer may be configured with a property indicating whether a WTRU should perform a first action or a second action
  The coverage status of the remote WTRU (which may be provided to the relay WTRU via PC5-RRC)
  The number of remote WTRUs connected to the relay WTRU According to an embodiment, a relay WTRU may initiate an RRC resume procedure towards the network to obtain resources on PC5 to forward the paging message, in the case the CBR is below a threshold. When the CBR is above a threshold, the relay WTRU may request resources using 2-step/4-step RACH procedure described herein.

According to another embodiment, a relay WTRU may initiate an RRC resume procedure if the paging message does not contain a high priority access/indication, or if the priority is below a threshold. On the other hand, the relay WTRU may request a SL resource while remaining in INACTIVE in the case the paging message contains a high priority indication, or if the priority is above a threshold.

According to an embodiment, a relay WTRU may trigger an RRC connection resume message, indicating the cause of the resume message is that the relay WTRU received a paging message for at least one of its remote WTRUs. The relay WTRU may receive a resume message which transitions the relay WTRU to RRC_CONNECTED. In such case, the relay WTRU may further receive a SL resource allocation for transmitting the SL paging message within the resume message. Alternatively, the relay WTRU may receive the SL grant in DCI scheduling once the relay WTRU is in RRC_CONNECTED. On the other hand, the relay WTRU may receive the an RRC reject/RRC release message from the network, indicating the relay WTRU should remain in RRC_INACTIVE. In such case, the remote WTRU triggers a mode 2 resource selection procedure to obtain resources for transmission of the paging via sidelink.

According to an embodiment, a relay WTRU in RRC_INACTIVE/RRC_IDLE may transmit the paging message over SL while remaining in RRC_INACTIVE/RRC_IDLE, if the remote WTRU is in coverage, and the SL CBR is above a threshold. Otherwise, the relay WTRU may initiate a resume procedure, indicating in the resumeRequest whether the remote WTRU is in coverage or out of coverage. If the relay WTRU receives a resume message, the relay may transmit the paging message while in RRC_CONNECTED. The relay may use SL resources provided by the network in DCI or in the resume message. If the relay WTRU receives a reject/release message in response to the resume, the relay may transmit the paging message on SL while remaining in INACTIVE/IDLE, and further indicating to the remote WTRU that it should initiate the connection via Uu. This may be the case if the remote WTRU is known by the relay WTRU to be in coverage. On the other hand, if the remote WTRU is out of coverage and the relay receives a reject message, the relay WTRU may drop the paging message.

Relay WTRU Determines the DRX Wakeup Slots for Each Remote WTRU and Provides this to the Remote WTRU According to an embodiment, a relay WTRU may determine the DRX wakeup slots and/or for each remote WTRU and provides this to the remote WTRUs for use as a DRX period for the remote WTRU to use while in RRC_IDLE/RRC_INACTIVE. A WTRU relay WTRU may independently determine such DRX pattern for each remote WTRU. Alternatively, the relay WTRU may determine a common DRX period to be provided to all remote WTRUs PC5-RRC connected to the relay WTRU. A relay WTRU may provide the DRX configuration in a PC5-RRC message to the remote WTRU. Such configuration may include:

The period of DRX wakeup times;
The RX resource pool to be used while the remote WTRU is in DRX on SL;
Timing of the paging frame/slot within the DRX;
Timing of any system information transmission with respect to the DRX transmission;
A WTRU ID, or similar ID, to be used by the remote WTRU to calculate the wakeup time and or timing of the paging on SL.

A relay WTRU may determine the DRX wakeup slots of the remote WTRU based on any or a combination of the following:

The RRC state of the relay WTRU
  a. For example, a relay WTRU may compute the DRX wakeup slots of the remote WTRU using different criteria/method when the relay WTRU is in RRC_CONNECTED compared to when the relay WTRU is in RRC_IDLE/RRC_INACTIVE.
The RRC state of the remote WTRU
  a. For example, a relay WTRU may use a first criteria/method to determine the DRX on period when the remote WTRU is in RRC_IDLE, and may use a second criteria/method to determine the DRX on period when the remote WTRU is in RRC_INACTIVE
The Uu paging occasions of one or more of the remote WTRUs
  a. For example, a relay WTRU may align the DRX on periods for the remote WTRUs with each of their Uu paging occasion, so the remote WTRU wakes up for SL DRX at or after such paging occasion
The number of attached remote WTRUs
  a. For example, the relay WTRU may determine the length of the on duration of the remote WTRU DRX cycle as a function of the number of remote WTRUs
The Uu paging occasions of the remote WTRUs
  a. For example, the relay WTRU may select a configuration of the DRX cycle which maximizes the number remote WTRUs which fall within a single on duration
The CBR on SL
  a. For example, the relay WTRU may determine the length of the DRX on duration based on the measured CBR
The bearer configuration (SL RLC bearer configuration or UL bearer configuration) of the remote WTRU(s) and/or the QoS of the active bearers configured at each remote WTRU
  a. For example, the relay WTRU may compute a maximum delay between a remote WTRUs Uu paging frame and the beginning of the DRX on period for that WTRU based on the QoS of any active bearers at the remote WTRU (i.e. for the case of the remote WTRU in RRC_INACTIVE).

Remote WTRU Determines the SL Slots where it should Wakeup for Paging/SI Reception on SL A remote WTRU may determine one or a number of SL slots where it should monitor SL for the reception of paging. A WTRU may monitor SL for the one or more slots each DRX period on sidelink. For example, a WTRU may be configured with and/or determine a SL paging window consisting of the set of slots where a WTRU may receive Uu paging via SL transmission by the relay WTRU. Specifically, a WTRU may be configured to wakeup from DRX at a specific slot, and continue to monitor SL for a fixed number of slots. Alternatively, a WTRU may monitor SL up to the reception of a paging message. Such paging message may contain paging information for other WTRUs. A WTRU may stop monitoring SL following reception of such paging message. Alternatively, a WTRU may continue to monitor SL for the entire number of slots if the paging message is not intended for the WTRU in question. A remote WTRU may determine the DRX period and/or location/number of slots to be monitored based on any or a combination of:

Network configuration
Group member ID, provided by upper layers
  a. For example, a WTRU may determine the SL slot(s) in which it performs SL monitoring and/or the SL slot(s) in which it expects to receive a paging message and/or system information on the SL based on the group member ID provided by the upper layers
  b. For example, a WTRU may determine its SL paging slot by taking the UL paging slot (computed as done in Uu) and adding an offset which depends on the group member ID
An identifier provided by/specific to the relay WTRU (relay WTRU L2 ID, or another ID)
  a. For example, a WTRU may compute a paging frame by including the relay WTRU ID, or another ID provided by the relay WTRU (e.g. in PC5-RRC message) as part of the computation of the paging frame. For example, the WTRU may be configured with a formula based on the L2 ID of the relay WTRU to compute the periodicity and offset of the paging frames on SL. The remote WTRU may wakeup at or prior to the computed paging frame.
Relative to timing of discovery message and/or resource pool, or other, possibly periodic message transmitted by the relay WTRU
  a. For example, a remote WTRU may determine the timing of its planned wakeup slot or start of its sidelink paging window based on some (pre)configured offset from a discovery message or other periodic message transmitted by the relay WTRU.
  b. For example, a remote WTRU may determine the start of its sidelink paging window relative to the resources in the resource pool for discovery reception. For example, the remote WTRU may determine the start of its sidelink paging window to be located at a certain time offset from the discovery resource pool that it closest to the WTRUs Uu paging occasion.

Relative to the timing of one or more previous wakeup/monitoring times of the remote WTRU
  a. For example, a relay WTRU may transmit in the discovery message, or similar periodic message, exact timing (e.g. slot, offset, etc.) of the timing of the next period Indicated by the relay WTRU (e.g. in a scheduling SCI, MAC CE, or PC5-RRC message)
  a. For example, a WTRU may wakeup, potentially periodically, at a fixed time. Such time may be (pre)configured to the WTRU. A WTRU may receive a discovery message, or a similar periodic message at that fixed time. In addition, a WTRU may receive (e.g. in a scheduling SCI, a MAC CE, or a PC5-RRC message) an indication of the time to wake up for reading the paging message. The WTRU may go back to DRX until the time indicated in the message. For example, a WTRU may receive, in the SCI scheduling the fixed time message (e.g. discovery message), an indication that an additional allocation (e.g. periodic indication) has been reserved. A WTRU may receive the paging message at the time of the indicated allocation, and perform DRX between the initial message and the paging message. For example, a WTRU may receive, in the discovery message (or similar periodic message), an additional message (e.g. a MAC CE) indicating the number of slots following the discovery message after which it should perform monitoring for paging/system information.
  b. For example, a relay WTRU may indicate a new timing for the paging occasion of the remote WTRU (e.g. in PC5-RRC signaling). If no such timing is provided, a remote WTRU may use its original computed paging occasion timing (i.e. based on WTRU ID) and determine the SL paging timing based on a (pre)configured offset from that timing, or an offset determined based on other examples given herein Relative to the timing of its computed paging occasion on Uu
  a. For example, a WTRU may determine its SL paging slot by taking the UL paging slot (computed as done in Uu) and adding an offset which depends on the group member ID Based on the measured CBR
  a. For example, a WTRU may determine its SL paging slot and/or the first monitoring slot by considering the measured CBR sometime prior to and/or during the wakeup. Specifically, a WTRU may determine the wakeup slot as an offset from a predetermined slot as defined in other solutions (e.g. a predefined time of discovery message), where such offset may further be a function of the CBR and potentially other parameters (e.g. offset=CBR_factor*group ID)

Relay WTRU Requests a Change in the Remote WTRU Paging Timing

According to an embodiment, a relay WTRU may request the change of the timing of a paging message from the network. Specifically, a relay WTRU may indicate the preference to change the timing of the Uu paging frame (for a remote WTRU) to a different frame/slot or to move the existing timing by an offset. The relay WTRU may send such request in an RRC message to network the (e.g. Sidelink WTRUInformation message or WTRUAssistanceInformation message). Additionally, a relay WTRU may also request such change for its own paging frame/slot, for the case the relay WTRU is in RRC_IDLE/RRC_CONNECTED. The contents of such a message may include:
  The identity of the WTRU (e.g. L2 ID) of the WTRU who's paging message should be sent;
  The absolute time, or time offset (e.g. from the computed paging occasion) for the desired paging timing, or a set/range of possible timings.

A relay WTRU may trigger such request at any or a combination of the following events/criteria:
  Following PC5-RRC connection establishment with a remote WTRU
    a. For example, a relay WTRU may determine the DRX on period of a remote WTRU based on the Uu paging occasions of the first WTRU to establish a PC5-RRC connection. Following this, the relay WTRU may send a request to change paging occasions of any subsequent remote WTRUs that connect via PC5-RRC, possibly if the time difference between the Uu paging occasion timing of the first WTRU and subsequent WTRUs is larger than a threshold
  Based on the time difference between the Uu paging occasions of any two remote WTRUs PC5-RRC connected to the relay WTRU
    a. For example, if the time difference between the paging occasions of any two remote WTRUs is larger than a threshold, the relay WTRU may trigger such a request Relay WTRU Determines New/Modified Paging Occasions of the Remote WTRU According to an embodiment, a relay WTRU may determine the Uu paging occasions of the remote WTRU. Such mechanism for paging determination may differ from the legacy formula for determination of the paging of a WTRU based on the WTRU ID. Such mechanism may be useful to align the paging occasions of multiple remote WTRUs together, so that the relay WTRU may monitor paging for the remote WTRUs efficiently while the relay WTRU is in RRC_IDLE/RRC_INACTIVE. A relay WTRU may determine the paging occasions of its remote WTRU:
  Based on its own paging occasion
    a. For example, a relay WTRU may assume the paging occasions of the remote WTRU correspond to its own paging occasions
    b. For example, a relay WTRU may determine the paging occasions of the remote WTRU based on an offset from its own paging occasion (where such offset may be determined by other factors herein)
  Based on the number of remote WTRUs that are PC5-RRC connected
  Based on the member ID or similar ID associated with a specific remote WTRU
    a. Such ID may be assigned to the relay WTRU/remote WTRU from upper layers
    b. Such ID may be determined based on the order in which the remote WTRU connected to the relay via PC5-RRC Relay WTRU Determines the Paging Occasions of the Remote WTRUs Based on its Own RRC/DRX State According to an embodiment, a relay WTRU may determine/identify the paging occasions of its attached remote WTRUs based on its own RRC state. Specifically, a relay WTRU may use a first mechanism to determine the remote WTRU paging occasions when in one state (e.g. RRC_IDLE, RRC_INACTIVE) and use a second mechanism to determine the remote WTRU paging occasions when in another state (e.g. RRC_CONNECTED). For example, a relay WTRU may determine the paging occasions of the remote WTRUs based on the WTRU IDs of each remote WTRU when the relay WTRU is in RRC_CONNECTED. When the relay WTRU is in RRC_IDLE, the relay may determine the paging occasions of the remote WTRUs based on any mechanism described further herein.

Remote WTRU Determines Whether to Perform Uu RRC Connection/Resume Over the Relay WTRU or Directly Via Uu According to an embodiment, a remote WTRU in RRC_IDLE/RRC_INACTIVE, and possibly PC5-RRC-connected to a relay WTRU, may determine whether to perform Uu RRC connection/resume directly via Uu, or through the relay WTRU based on one or a combination (e.g. based on the and/or of multiple conditions) of the following criteria:

Information in the paging message received from the network
- a. For example, a WTRU may receive, in the paging message, an explicit indication of whether to connect to the network via the relayed link, or the direct link
- b. For example, a WTRU may receive a class/category of access in the paging message. A WTRU may further be (pre)configured with whether initiate connection/resume via Uu or through the relay depending on the class/category in the paging message. For example, a WTRU may be (pre)configured with specific rules (based on other factors herein) in which access for each class/category in the paging message should be performed directly on Uu or via the relay Uu bearers which are configured or for which data has arrived
- a. For example, a WTRU may be configured with a preferred link (direct Uu or PC5) on which to establish a connection for a given bearer on which data has arrived (for UL triggered) or within the paging message indicating which bearer the data has arrived for (for DL triggered)

SL characteristics such as
- a. Measured CBR
  - i. For example, a WTRU may decide to connect via Uu or via a relay based on the measured CBR at the time of the paging reception or UL data arrival. Specifically, a WTRU may connect via Uu if the measured CBR is higher than a threshold
- b. Measured RSRP, CQI, or other, of the relay WTRU
  - i. For example, a WTRU may connect via Uu or PC5 depending on the measured RSRP (e.g. of the relay discovery messages) or other SL measurement (e.g. CQI). For example, the WTRU may connect via Uu if the measured relay RSRP is below a threshold Uu measurements of the cell Whether the relay WTRU is connected to the same cell/related cell as the as the cell in which the remote WTRU is camped/in coverage of
- a. For example, a WTRU may connect via Uu of the cell having the highest measured RSRP. If this cell is the same as the cell to which the relay WTRU is connected, the WTRU may be allowed to connect directly via Uu. Otherwise, the WTRU may connect via the relayed path.
- b. For example, in the above example, direct Uu connection may be allowed to a cell which is related to the cell to which the relay WTRU is connected. Such "related" can be determined based on the transmission of an identifier (e.g. an area ID) in the system information. For example, if the area ID obtained from the relay WTRU matches the area ID broadcast directly on Uu, the remote WTRU may connect directly via Uu.

A WTRU which decides to connect via Uu directly may issue a release of the PC5-RRC connection to the peer (relay WTRU).

RAN Area Update Procedure for Remote/Relay WTRU

Relay WTRU RAN Area Update Implicitly Results in Remote WTRU RAN Area Updates

According to an embodiment, a RAN area update performed by a relay WTRU may implicitly result in a RAN area update for each of the remote WTRUs. Specifically, a relay WTRU, upon triggering a RAN area update, may transmit an RRCResume message containing the identities (e.g. remote WTRU ID, L2 ID, group member ID, or I-RNTI) of the PC5-Connected remote WTRUs. Alternatively, a remote WTRU may keep the network informed of the PC5-Connected remote WTRUs while in INACTIVE. Specifically, a relay WTRU may perform a network access (e.g. an RRC resume procedure, or a similar RAN area update procedure) upon a new PC5-RRC connection of a remote WTRU. Specifically, a relay WTRU may perform a network access upon the release of one or more PC5-RRC connected remote WTRUs. Specifically, a relay WTRU may perform a network access (e.g. resume procedure) in the case a remote WTRU changes its L2 ID. In such second alternative, a relay WTRU can initiate a RAN area update procedure without providing the WTRU IDs of the remote WTRUs in the resume message. In yet another alternative, a relay WTRU may periodically inform the network of the presence of new remote WTRUs and/or the release of other remote WTRUs. In yet another alternative, a relay WTRU may inform the network when the number of WTRUs PC5-RRC connected to the relay WTRU changes by a certain amount. In a number of these alternatives, a relay WTRU may include only the information of the changed WTRUs since the last network access which provided the list of attached PC5-RRC connected WTRUs.

Following transmission of a resume request message by the relay (e.g. for a RAN area update), the relay WTRU may receive updated RAN area information for each of its PC5-RRC connected remote WTRUs. Specifically, a relay WTRU may receive one or more updated RAN area configurations (e.g. I-RNTI, RAN area, RNAU timer) for one or more remote WTRUs. In one example, a relay WTRU may receive (e.g. in an RRC release message) a Uu container containing an RRC message with a set of WTRU IDs and corresponding RAN area configuration for each WTRU. Alternatively, the container may contain multiple RRC messages where each message is encoded with the security key specific to that WTRU. The relay WTRU may forward such container to all of the remote WTRUs (e.g. using a group message). Each remote WTRU may decode the RRC message associated with its WTRU ID and apply the new RAN area configuration associated with its WTRU ID. In another example, a relay WTRU may receive multiple containers, each associated with a specific L2 ID. The relay WTRU may send each container separately to each WTRU (e.g. in a dedicated PC5-RRC message).

Remote WTRU Triggers a RAN Area Update Following Relay Reselection

A remote WTRU may trigger a RAN area update during/following relay reselection. Specifically, a remote UE may obtain the new cell ID associated with the target relay. If the cell is outside of the RAN area configured at the remote WTRU, the remote UE may trigger a RAN area update procedure.

Remote WTRU Favors Relay Reselection that does not Require RAN Area Update

According to an embodiment, a WTRU may perform relay reselection in consideration of whether such reselection will result in a RAN area update. Specifically, a remote WTRU may favor reselection to a relay WTRU such that the corresponding reselection does not trigger a RAN area update procedure. For example:

- A remote WTRU may be configured with an offset in the RSRP measurements of the old/new relay and/or an offset in the Uu measurements of the old/new relay WTRU, and/or an offset in the measurement threshold which triggers the reselection, depending on whether the new relay requires a RAN area update by the remote WTRU (e.g. a first offset/threshold for a potential cell reselection which does not require a RAN area update, and a second offset/threshold for a potential cell reselection which would require a RAN area update;
- A remote WTRU may trigger a new relay discovery/selection procedure (e.g. transmission of a discovery message, monitoring of discovery in a different band/set of resources) if a current/potential relay selection procedure at the WTRU would trigger a RAN area update.

Remote WTRU Triggers a RAN Area Update Following Mobility of the Relay WTRU (HO/Reselection)

According to an embodiment, a remote WTRU in RRC_INACTIVE and PC5-RRC connected to a relay WTRU may trigger a RAN area update as a result of mobility of the relay WTRU. Such mobility may be the result of any of the following executed by the relay WTRU:

- A Handover (HO) or Conditional Handover (CHO) performed by the relay WTRU;
- A cell reselection performed by the relay WTRU;
- A RAN area update performed by the relay WTRU.

A relay WTRU may inform its remote WTRUs of any of the above mobility events:

By sending an explicit/implicit message over PC5-RRC
  a. For example, a remote WTRU may transmit a PC5-RRC message indicating a reselection was completed, and containing the new cell the relay WTRU is camped on;
  b. For example, a remote WTRU may trigger the transmission of new system information, whereby the new system information corresponds to the system information acquired from the new cell to which the WTRU has reselected;
  c. For example, a remote WTRU may send a SL paging message in the SL paging window of the remote WTRU(s). Such SL paging message may have an indication for the remote WTRU to perform RAN area update. Such SL paging message may have an indication that triggers the remote WTRU to acquire new system information on SL;
  d. For example, a relay WTRU may change a system information version number upon cell reselection, handover, RAN area update, etc. The relay WTRU may transmit the new system information version number in the next discovery message, periodic control message, or minimum system information transmission to the remote WTRU.

A remote WTRU, upon reception of the above indication from the relay WTRU, may initiate a RAN area update procedure via the relay WTRU.

Remote WTRU Triggers a RAN Area Update Following Mobility with Regard to the Relay According to an embodiment, a remote WTRU may maintain its RRC_INACTIVE state when changing between a direct connection via Uu and a relayed connection via a relay, or upon changing from one relayed connection (via a first relay) to another relayed connection (via a second relay). In such cases, a WTRU may initiate a RAN area update procedure. According to an embodiment, a remote WTRU in RRC_INACTIVE may trigger a RAN area update upon any of the following events related to its own mobility:

Moving from a relayed connection to direct Uu connection
  a. For example, upon moving from RRC_INACTIVE state associated with a relayed connection, to RRC_INACTIVE state associated with direct Uu, possibly as a result of a reselection decision (i.e. from relay to cell)
  b. For example, upon releasing a PC5-RRC connection, possibly as a result of upper layer release, PC5 RRC reconfiguration failure, SL RLF, etc. while PC5-RRC connected to a relay WTRU, and in coverage of a cell in Uu
    i. Specifically, if a remote WTRU declares SL-RLF with a relay while in RRC_INACTIVE, and the remote WTRU selects a cell during/following SL-RLF such that the cell is suitable, the remote WTRU may trigger a RAN area update procedure.
  c. Such RAN area update may be performed by the remote WTRU regardless of the cell. Alternatively, such RAN area update may be performed only when
    i. The WTRU was configured with a RAN area, or INACTIVE configuration
    ii. The RAN area of the target (Uu) cell is different than the RAN area to which the previously connected relay WTRU was part of Moving from a direct Uu connection to a relayed connection, or from a first relayed connection to a second relayed connection
  a. For example, upon establishing a PC5-RRC connection with a relay WTRU
  b. For example, upon being successfully configured with a PC5-RLC channel configuration, or successfully establishing such PC5 RLC channel
  c. Such RAN area update may always be performed by the remote WTRU. Alternatively, such RAN area update may be performed only when
    i. The WTRU was configured with a RAN area, or INACTIVE configuration
    ii. The RAN area of the relay WTRU is different than the RAN area of the cell in which the WTRU was camped, or the RAN area of the previously connected relay WTRU Relay WTRU Performs RAN Area Update or Similar RRC Message Transmission on Behalf of Remote WTRU(s)

According to an embodiment, a relay WTRU may perform a RAN area update on behalf of a remote WTRU. Specifically, a relay WTRU may inform the network of the change of the RAN area associated with an attached remote WTRU. A relay WTRU may trigger such RAN area update:

Upon establishment of a PC5-RRC connection with a remote WTRU
   a. Possibly when the RAN area associated with the remote WTRU prior to the PC5-RRC connection is different than the RAN area of the relay WTRU Upon reception of a sidelink reconfiguration message (possibly the first sidelink reconfiguration following the PC5-RRC connection establishment) from the peer WTRU For example, a remote WTRU may provide a relay WTRU with the RAN area, or the cell ID, it was previously associated with (where such association was either via direct camping on Uu, or represented the attached cell/RAN area of the relay WTRU that the remote WTRU was previously attached to). The relay WTRU, if it is RRC_INACTIVE, may trigger a RAN area update procedure upon establishment of the PC5-RRC connection, possibly if the RAN area of the relay WTRU is different than the previous RAN area associated with the remote WTRU. For example, if the relay WTRU is in RRC_CONNECTED, the PC5-RRC connection may trigger transmission of an RRC message.

Relay WTRU RAN Area Update Following PC5-RRC Connection or Reception of SL Reconfiguration According to another embodiment, a relay WTRU may perform a similar procedure (RAN area update, or similar RRC message transmission while staying in RRC_INACTIVE) to inform the network of a new PC5-RRC connection with a remote WTRU in RRC_IDLE. Specifically, a relay WTRU may trigger a RAN area update, or similar NW access upon establishment of a PC5-RRC connection with a remote WTRU for relaying, or reception of the first reconfiguration message following PC5-RRC connection establishment. The relay WTRU may further indicate as part of the access The RRC-state of the remote WTRU (e.g. IDLE or INACTIVE)

The NW identity of the remote WTRU
      a. For example, the S-TMSI (e.g. for a remote WTRU in IDLE) or the I-RNTI (e.g. for a remote WTRU in INACTIVE), or the L2 ID or new ID which can identify the remote WTRU to the network The previous cell/RAN area of the remote WTRU, as provided by the remote WTRU Relay WTRU RAN Area Update Using 2-Step RACH A relay WTRU may further perform a 2-step RACH procedure upon establishment of a PC5-RRC connection, upon reception of a SL reconfiguration message from the remote WTRU, or at some time following a PC5-RRC connection with a remote WTRU. A relay WTRU may include, in the two step RACH procedure, an RRC message corresponding to the above. A relay WTRU may further decide to perform such two-step RACH procedure, as opposed to other procedure (4 step RACH, or full connection establishment), depending on:

The RRC state of the remote WTRU, or any information provided by the remote WTRU which may indicate its RRC state with the network:
      a. For example, if the remote WTRU was previously in RRC_INACTIVE or RRC_IDLE, the relay WTRU may trigger a 2-step RACH procedure. Otherwise, if the remote WTRU was previously in RRC_CONNECTED, the relay WTRU may trigger a connection establishment, or a 4-step RACH procedure. The remote WTRU may implicitly/explicitly provide an indication of its RRC state, for example, in the first PC5 RRC reconfiguration message following the connection establishment The previous RAN area of the remote WTRU
      a. For example, if the remote WTRU's RAN area is not changed as a result of the PC5-RRC connection, the relay WTRU may trigger a 2-step RACH procedure. The remote WTRU may provide the RAN area or cell ID in the first reconfiguration message following the PC5-RRC connection The size of the RRC message to be transmitted
      a. For example, if the RRC message to be transmitted is less than a preconfigured number of bits, the relay WTRU may trigger a 2-step RACH procedure. The relay WTRU may determine the size of the message based on the data/ID etc to be sent to the network Whether a relay WTRU receives SL configuration for data transmission
      a. For example, the relay WTRU may trigger the 2-step RACH procedure upon reception of an RRC reconfiguration message received from the peer WTRU. If such message does not configure an RLC bearer for data transmission, or does not contain configuration requiring establishment of a Uu connection, the relay WTRU may trigger a 2-step RACH procedure. Otherwise, the relay WTRU may trigger a normal RACH procedure and possibly transition into RRC_CONNECTED state.

Remote WTRU triggers a Release Procedure following a RAN Area Update of the Relay According to an embodiment, a remote WTRU may trigger a release procedure (e.g. a PC5-RRC release and/or a Uu RRC release procedure) following a RAN area update if the relay WTRU. Alternatively, a remote WTRU may initiate a reestablishment, resume, or RAN area update, directly via Uu. For example, a remote WTRU in coverage of Uu may release the PC5-RRC connection to the relay WTRU and trigger a RAN area update (or similar NW access) directly via Uu upon mobility of the relay WTRU.

Relay WTRU Informs a Remote WTRU of when it should Trigger a RAN Area Update

According to an embodiment, a relay WTRU may determine whether one or more remote WTRUs should trigger a RAN area update following a mobility event (e.g., Handover (HO), cell reselection) at the relay WTRU. Specifically, a relay WTRU may obtain the Uu RAN area configuration from the remote WTRU in PC5-RRC signaling. If the relay WTRU reselects to a cell which is outside of the remote WTRU RAN area, or if the relay WTRU is handed over to a cell which is outside of the remote WTRU RAN area, the relay WTRU may send an indication to the remote WTRU. A relay WTRU may further send such indication only to the remote WTRUs which are in RRC_INACTIVE, and which require a RAN area update. Alternatively, a relay WTRU may send the message/indication to all remote WTRUs. Any mechanisms described herein may be used to send the indication over PC5. The remote WTRU, upon reception of the indication, may trigger the RAN area update. Alternatively, a remote WTRU, upon reception of the message may first determine if it requires a RAN area update. For example, a remote WTRU in RRC_INACTIVE may read system information and/or information in the indication (e.g. a cell ID) and trigger a RAN area update if the cell ID is outside of its RAN area.

PC5 Link Management (SL-RLF) for IDLE/INACTIVE
Remote/Relay WTRU Performs a Transmission within the DRX of the Peer WTRU for Link Management A relay and/or remote WTRU may perform periodic or semi-periodic transmission for the purposes of link monitoring. Specifically, a relay/remote WTRU may configure one or more transmissions to occur within the IDLE/INACTIVE DRX period of the peer WTRU. Such transmissions may be any of the following:
RSRP measurement;
Discovery message transmission;
Dummy data transmission;
CQI report;
Sidelink paging message transmission;
SL system information or system information update.

The transmitting WTRU may ensure such transmission falls within the DRX active period of the peer WTRU. For example, the transmitting WTRU may perform resource selection within the DRX active period of the peer WTRU. For example, the transmitting WTRU may be provided with a configured grant for such transmission.

The transmitting WTRU may perform HARQ-based RLF mechanism using the HARQ feedback received from such transmission. Specifically, if the number of DTX received exceeds a (pre)configured threshold, the transmitting WTRU may trigger a SL-RLF procedure.

A WTRU may enable HARQ feedback on certain transmissions when they occur within the DRX on period. A WTRU may further enable HARQ feedback of such transmissions within the DRX under the condition that no data, system information, or other SL transmissions are performed within the DRX on period.

Transmitting WTRU Performs Retransmissions as Long as DTX is Received

A transmitting WTRU may further determine the number of transmissions/retransmissions of the "pulse" signal within the DRX on period based on the reception of HARQ feedback from the peer WTRU. Specifically, a transmitting WTRU may be (pre)configured with a minimum number of transmissions (e.g. 1 transmission) per DRX on cycle. A transmitting WTRU may perform additional transmission and/or retransmissions of the pulse signal depending on the HARQ feedback received from one of (e.g. last) (pre) configured transmission. For example, the transmitting WTRU may retransmit an RSRP measurement report within a DRX on cycle as long as it receives HARQ DTX, or until SL-RLF is failed (e.g. number of consecutive HARQ DTX reaches maximum threshold). Such retransmissions may fall outside the pulse signal. Alternatively, the retransmissions may be schedule so that they fall within the DRX active time of the peer WTRU.

Receiving WTRU Performs SL-RLF Based on Quality of Transmission in DRX Period

A receiving WTRU may, when configured with SL-DRX and when receiving the above mentioned periodic/semi-periodic transmissions with the on duration (e.g. RSRP) may perform SL-RLF based on the quality of such periodic measurements. Specifically, a WTRU may trigger SL-RLF:
If the RSRP is below a threshold, possibly for a number of (possibly consecutive) transmissions A WTRU may enable such quality-based SL-RLF measurements when the WTRU transitions to Uu IDLE/INACTIVE while PC5-connected to a relay. When the WTRU is in RRC_CONNECTED, it may perform HARQ-based RLF and disable measurement-based SL-RLF.

Actions Upon Triggering SL RLF when PC5-RRC Connected to a Relay/Remote WTRU

A relay WTRU, upon triggering SL RLF with a remote WTRU, may perform any of the actions upon removing of a remote WTRU from the list of connected remote WTRUs at the relay. Such actions, that may be performed in any order, may be:

The relay may perform network access (connection establishment/resume/RAN area update) to inform the NW;
The relay WTRU may log/remember the remote WTRU (e.g. L2 ID) for which RLF was triggered and may indicate it to the network the next access (resume, RAN area update, etc);
The relay WTRU may stop monitoring paging (on Uu) associated with the remote WTRU;
The relay WTRU may stop reading system information for and/or stop updating the remote WTRU with system information update;
The relay WTRU may remove the remote WTRU from its list of connected remote WTRUs;
The relay WTRU may, if it is in RRC_CONNECTED, and has no more remote WTRUs in the list of connected remote WTRUs, or if all connected remote WTRUs are in RRC_IDLE/RRC_INACTIVE, may:
  a. Transition to RRC_IDLE/RRC_INACTIVE—the WTRU may transition to RRC_INACTIVE if it has at least one connected remote WTRU in RRC_INACTIVE, otherwise, it may transition to RRC_IDLE;
  b. Start/enable the inactivity timer associated with RRC_IDLE/RRC_INACTIVE
The relay WTRU may, if it is in RRC_INACTIVE, and it has no more remote WTRUs connected, or all connected remote WTRUs are in RRC_INACTIVE:
  a. Transition to RRC_IDLE
  b. Start/enable the inactivity timer associated with RRC_INACTIVE A remote WTRU may perform one of a set of different procedures upon SL-RLF, where the performed procedure will depend on its Uu RRC state at the time of the SL RLF and/or the result (cell or relay, and same cell or different cell) of reselection following SL-RLF. A remote WTRU may perform the following actions upon triggering PC5-RLF with a relay WTRU, possibly in any order:
The remote WTRU may trigger relay reselection. For example, if the remote WTRU is able to find another relay WTRU, possibly connected to the same cell, and/or if the remote WTRU is OOC, the remote WTRU may perform any of the following:
  a. Once the remote WTRU connects via PC5-RRC to another relay, the remote WTRU may inform the new peer WTRU of the previous RLF, by providing the L2 ID of the previous relay WTRU
  b. Alternatively, once the remote WTRU connects via PC5-RRC to another relay, the remote WTRU may trigger an RRC procedure with the network, possibly indicating the cause of the procedure, or possibly informing the network of the previous RLF on the PC5-RRC and providing relevant information (e.g. previous L2 ID of the relay):
    i. If the remote WTRU was previously in RRC_INACTIVE/RRC_CONNECTED, the remote WTRU may trigger a RNAU/Resume procedure via the new relay
    ii. If the remote WTRU was previously in RRC_IDLE, the remote WTRU may trigger a connection establishment via the new relay
The remote WTRU may perform a cell selection operation. Such operation may be performed, for example, if the remote WTRU determines that it is in coverage and/or the remote WTRU cannot find an alternative relay to select and/or a Uu cell is determined to be better quality than a relay WTRU based on some criteria The remote WTRU may perform an access directly to Uu. Specifically:
- a. If the remote WTRU is Uu RRC-CONNECTED at the time of the SL RLF:
    - i. the remote WTRU may transition to RRC_INACTIVE if it is in coverage, possible of a different cell as the cell it was connected to via the relay, and may initiate a resume procedure via Uu
        1. The remote WTRU may determine the I-RNTI to use for the resume request message based on one or a combination of the following:
            - a. The remote WTRU may include a special (dedicated) identifier in part of the I-RNTI (e.g. a preconfigured set of combination of bits) when such resume is performed following transition to INACTIVE as a result of SL-RLF
            - b. The remote WTRU may include an I-RNTI provided to it by the network while in RRC_CONNECTED
            - c. The remote WTRU may include its C-RNTI, or another connected mode identifier. Such C-RNTI could be used, for example, if the remote WTRU can be scheduled via Uu while or immediately after the RRC connection is moved to Uu. Such connected mode ID can be used, for example, to identify the remote WTRU at the network when it communicates via a relay WTRU).
        2. the remote WTRU, if reselects to the same cell as the cell it was connected to via the relay prior to the RLF, may trigger a 2-step/4-step RACH procedure and provide any of the following information within the 2-step/4-step RACH:
            - a. the WTRU's ID (e.g. C-RNTI)
            - b. A status report associated with any of its protocol layers and/or bearers, such as a PDCP status report, and RLC status report, etc.
        3. the remote WTRU may stay in RRC_CONNECTED if it is in coverage, possibly of the same cell as the cell it was connected to via the relay, and may initiate an RRC message transmission to the network (e.g. SidelinkWTRUInformation)
        4. the remote WTRU may initiate a re-establishment procedure
        5. the remote WTRU may trigger a CHO, possibly assuming it performs relay selection to a cell on which it has a CHO configuration, possibly assuming it reselects to a cell that is different than the cell to which the relay was associated/connected to
        6. the remote WTRU, if it was in RRC_CONNECTED at the time of SL RLF, possibly only if it reselects to a cell which is different than the cell to which its relay was connected to, may trigger a re-establishment procedure
    - ii. If the remote WTRU is in Uu RRC_INACTIVE at the time of SL RLF:
        1. The remote WTRU may initiate a resume procedure directly via Uu, possibly if the WTRU selects to the same cell in which it was associated with at the time of the SL RLF
        2. The remote WTRU may transition to RRC_IDLE and may initiate a connection establishment procedure via Uu, possibly if the WTRU selects to a cell which is different than the cell it was associated to via the relay when the SL RLF occurred
        3. The remote WTRU may transmit a PC5-RRC message to the new relay WTRU where such message may contain:
            1. Measurements of Uu and/or PC5
            2. Identity of the previously connected/camped cell
            3. Identity of the previously connected relay WTRU, or any currently connected relays
    the remote WTRU may initiate monitoring of Uu PDCCH.

According to an embodiment, a remote WTRU may trigger cell/relay reselection following SL-RLF. Once cell/relay reselection has completed (and a new cell/relay has been found)
- if the remote WTRU is in RRC_CONNECTED
    - a. if the remote WTRU selects to a cell which is different than the cell which the previous relay was connected to, or a relay that is connected to a different cell than the cell its previous relay was connected to, the remote WTRU may initiate a re-establishment procedure (transmit a re-establishment request)
        - i. the re-establishment request to a cell on Uu may be a legacy re-establishment request message
        - ii. the re-establishment request message to a cell via a relay WTRU may be preceded by transmission of a SL RRC message, and/or may be distinguished from the legacy re-establishment, and/or may have information about
            1. the relay WTRU,
            2. the SL measurements (e.g. CBR, CR, RSRP, CQI, etc)
    - b. if the remote WTRU selects to a cell which is the same as the cell which the previous relay was connected to, or a relay that is connected to the same cell than the cell it was previously connected to, the remote WTRU may:
        - i. For the case of direct Uu, trigger a legacy re-establishment message
        - ii. For the case of a relayed link, not trigger any Uu procedure, and transmit only a PC5-RRC message
- if the remote WTRU is in RRC_INACTIVE
    - a. for the same cell case:
        - i. Transmit a PC5-RRC message to the new relay WTRU, in case connecting via a relay
        - ii. Transmit a RAN area update in case connecting via Uu, where such RAN area update identifies also:
            1. the previous relay WTRU the remote WTRU was connect to
    - b. For the different cell case
        - i. Transmit a PC5-RRC message to the new relay WTRU, in case connecting via a relay
        - ii. Transmit a RAN area update in case connecting via Uu, where such RAN area update also identifies
            1. The previous relay WTRU the remote WTRU was connected to
- if the remote WTRU is in RRC_IDLE
    - a. For the different or same cell case
        - i. Transmit a PC5-RRC message to the new relay WTRU NW Informs a Relay WTRU Upon Triggering SL RLF when PC5-RRC Connected to a Relay/Remote WTRU The network may inform a relay WTRU that an attached SL remote WTRU has triggered a SL-RLF. A relay WTRU may receive a remote WTRU release message from the network. Such message may be received:
- via a paging message, if the relay WTRU is in RRC_IDLE/RRC_INACTIVE
- via a dedicated RRC message, if the relay WTRU is in RRC_CONNECTED.

The relay WTRU may receive the ID of the remote WTRU (e.g. the L2 ID) in such a message.

Upon reception of such message, the relay WTRU may perform the actions upon removing of a remote WTRU from the list of connected remote WTRUs at the relay.

Remote WTRU Triggers SL-RLF Following Indication from a Different Relay WTRU or gNB SL RLF may be detected by the relay WTRU, but the relay WTRU may not be able to inform the remote WTRU of this. Especially for a remote WTRU in RRC_CONNECTED, this may affect service continuity for DL-only traffic when SL-RLF occurs.

According to an embodiment, a remote WTRU may monitor transmissions from one or more alternate relay WTRUs. The alternate relay(s) may be a relay(s) to which the remote WTRU has another PC5-RRC connection. Alternatively, the message may be transmitted by a WTRU in which the remote WTRU has no PC5-RRC connection (i.e. transmitted as a broadcast message). The remote WTRU may determine that a SL-RLF has occurred based on reception of a message indicating such from the alternate relay. Without loss of generality, such message can be received directly from a cell via Uu. The remote WTRU, upon reception of the message, may trigger any of the procedures described herein associated with detection of SL RLF.

This message may by a SL RRC message transmitted by the relay WTRU, or a Uu RRC message transmitted by the cell via the relay WTRU.

The message may identify the unicast link (e.g. source/destination L2 ID) on which SL RLF was detected by the relay WTRU.

According to a first embodiment, a remote WTRU may receive such indication via PC5-RRC from another PC5-RRC connected relay WTRU. The relay WTRU may receive a trigger from the network (e.g. a reconfiguration, a paging message, a DCI, MAC CE, etc) to transmit such message using PC5-RRC.

According to a second embodiment, a remote WTRU may receive such indication via a broadcast transmission (possibly using PC5-RRC over groupcast/broadcast) from another relay WTRU. For example, the remote WTRU may receive such indication in a discovery message. For example, the remote WTRU may receive such indication in a PC5-RRC transmission made over a specific L2 destination ID monitored by the remote WTRU for receiving such message. Similar to the first embodiment, the relay WTRU may trigger transmission of such message following indication from the network According to a third embodiment, a remote WTRU may receive such indication via a Uu message, possibly where such Uu message is relayed by one or more alternate relay WTRU. Specifically, the remote WTRU may receive such message:
- in a system information transmission
  a. specifically, a remote WTRU may monitor system information relayed by multiple remote WTRUs, possibly where such system information is embedded/encapsulated within a discovery message on sidelink
- in a paging message
  a. specifically, a remote WTRU may receive a Uu paging message, possibly relayed via sidelink, where such Uu paging message may further indicate that a SL-RLF was detected by the relay WTRU
- in a Uu RRC message
  a. specifically, a remote WTRU may maintain multiple connections (via the current relay WTRU and via an alternate relay WTRU), possibly in a dual connectivity-like manner and may receive the indication in a Uu RRC message received over the different link A remote WTRU may be configured to monitor for such indication based on the Uu RRC state and transmission/reception activity. For example, the remote WTRU may monitor for the indication only when in RRC_CONNECTED. For example, the remote WTRU may monitor for such indication less frequently when in RRC_IDLE/RRC_INACTIVE, possibly according to some fixed or (pre)configured schedule. For example, the remote WTRU may monitor for such indication (possibly more frequently) when there is absence of transmissions/receptions to the relay WTRU.

Methods for System Information Transmission to Remote WTRUs

Remote WTRU Transmits an SIRrequest on Sidelink

According to an embodiment, a remote WTRU may send an SI request on sidelink to a relay WTRU. A remote WTRU may send such request to its attached relay WTRU (when PC5-RRC connected). Alternatively, a WTRU may broadcast an SI request on sidelink to reach relay WTRUs it is not PC5-RRC connected to. Such SI request may be broadcast when the remote WTRU is not PC5-connected. Such SI request may be broadcast when the remote WTRU is PC5-connected but requests SI associated to cell to which another relay WTRU is connected.

The remote WTRU may set the L2 destination ID of the SI request as follows:
- A L2 destination ID associated with SI request that is (pre)configured
- A L2 destination ID associated with SI request provided by upper layers
- The WTRUs own L2 source ID
- The L2 source ID of the relay WTRU from which the remote WTRU is requesting SI (if the remote WTRU requests SI from a single remote WTRU)
- The unicast L2 ID of the relay WTRU it has a unicast link with A remote WTRU may include any of the following information in an SI request
- The particular SIB/SI it is requesting
- A sequence number associated with a portion/segment of the SIB it is requesting
- The L2 ID(s) of the relay WTRU(s) which should respond (i.e. the L2 IDs of the relay WTRUs from which the remote WTRU is requesting SI).
- The expected time (slot, set of slots) or the expected resource pool on which it expects/requests to receive the SI
- The SI tag the remote WTRU has the last valid SI for, or similar indication of the version of the SI the remote WTRU is requesting
- An indication of whether the remote WTRU is in coverage or out of coverage a. If in coverage, the cell ID (or an equivalent ID broadcast by the cell, such as an area ID) of the cell(s) that the remote WTRU is in coverage of
  i. For example, a remote WTRU may include this information only in the case the remote WTRU is in coverage of a cell which is different than the cell which the relay WTRU is connected to.
b. Uu measurements and/or SL measurements
  i. For example, a remote WTR may include the Uu measurements associated with the cell it is in coverage of (if the remote WTRU is in coverage) while Uu connected via a relay WTRU to another cell A WTRU may transmit an SI request using any of the following:
PC5-RRC message
MAC CE
SCI transmission, indicating the SI request A remote WTRU may request SI upon any of the following:
During/as part of relay selection procedure:
  a. For example, a remote WTRU, prior to selecting a relay, may obtain the SI of the cell associated with such relay using an SI request. A remote WTRU may determine whether it can select a relay (or whether a relay is not selected) depending on the SI of the associated cell. For example, a remote WTRU may select the cell with the best measurements such that the associated cell allows the remote WTRU to attach to the cell via the relay (as determined from the contents of the SI)
  b. For example, a remote WTRU may obtain the SI of all relays which has RSRP above a threshold (e.g., "suitable relays"). The remote WTRU may then select a relay based on the WTRU being allowed to connect to the cell. Alternatively, the remote WTRU may use information from the SI to select the relay among the suitable relays. For example, the remote WTRU may select a relay which is connected/associated to the same cell as the remote WTRU was previously connected/associated to (via a relay or directly via Uu), or a cell that is part of the same RAN area or similar configured area
Change in the SI tag broadcast by the (possibly PC5-RRC connected) relay WTRU
Following relay selection and/or following PC5-RRC connection establishment
  a. For example, a remote WTRU may transmit a request following the establishment of a PC5-RRC connection with the relay WTRU A relay WTRU may respond to an SI request only when the SI request contains the L2 ID of the relay in question. This may avoid many transmissions of SI when the SI request is broadcast.

A relay WTRU may transmit SI on sidelink in groupcast, potentially following an SI request received by a remote WTRU.

Remote WTRU Indicates SI Request Message to Both Relay and NW

The remote WTRU may transmit an SI request message transparently using a relayed SL RB (e.g. Uu SRB0). In some cases, an SI request which is transparent to the relay WTRU may cause issues (e.g. relay WTRU may not know which SI to be sent to the remote WTRU).

According to one example embodiment of the above embodiment, a remote WTRU may transmit an SI request using a Uu RRC message to the relay WTRU (e.g. using a relayed SRB0). In addition to such, the remote WTRU may further inform the relay WTRU of the transmission of such relayed SI request message. For example, the remote WTRU may indicate to the relay WTRU that an SI request is being transmitted on relayed Uu SRB0 by:
An indication in SCI
  a. For example, an explicit indication (bit, new SCI format, new field in SCI) can be used to indicate that the transmission on SRB0 is associated with an SI request
  b. For example, the WTRU may re-use an existing field in SCI to indicate an SI request (e.g. by setting a L2 source/destination address to a (pre)configured or predefined value)
Including a MAC CE in the sidelink transmission
  a. For example, a WTRU may transmit a SL MAC CE along with the SI request on Uu SRB0. Such SL MAC CE may further contain information about the SI being requested
Using a dedicated LCH (possibly associated with the SI being requested)
  a. For example, a WTRU may transmit SI request on a dedicated SL LCH that is associated with a relayed LCH. For example, a remote WTRU may indicate the specific SI or group of SI requested by selecting the SL LCH or SL RLC bearer over which to transmit the SI request message. Specifically, the WTRU may transmit the SI request over Uu SRB0, and select the SL RLC channel over which to map the message to based on the specific SI being requested.
Using a specific sidelink resource
  a. For example, the remote WTRU may transmit an SI request message (e.g. possibly a Uu SRB0 message) by using a dedicated or predefined sidelink resource. Such resource may be:
    i. A specific time/frequency resource on sidelink
    ii. A specific sidelink process reserved for SI request
    iii. An SCI reserving a resource with a special reservation period, number of subchannels, or other property associated with resource reservation whereby such property is set to some (pre)configured or predefine value to distinguish an SI request
  b. In any of the embodiments of the above example, the predefined resource may further indicate the specific SI being requested Remote WTRU Determines the Mechanism for Transmitting SI Request and/or Receiving the Requested SI A remote WTRU may send SI request and/or receive the requested SI using any of a number of mechanisms. Such mechanisms may be associated with performing a request (and/or receiving the SI) directly to the network via Uu, or sending the request via a relay. Such mechanisms may be associated with sending the request using an RRC message associated with one interface or another (PC5 RRC vs Uu RRC). Such mechanism may be associated with requesting SI or requesting actual SIBs. Such mechanism may be associated with whether the request is transparent or visible to the relay WTRU. Such mechanism may be associated with whether the remote WTRU needs to include additional information, possibly described herein, into the request. Specifically, such determination of mechanism may include any of:
Transmitting the request using a PC5-RRC message, or using a Uu SRB message (mapped to a relayed SL RLC channel)

Including, in the SI request, the requested SI messages, or the specific SIBs to request
  a. For example, a remote WTRU may use some factors to determine whether to transmit an SI request message or a SIB request message
  b. For example, a remote WTRU may or may not include the requested SIBs in the SI request to the relay WTRU based on some factors
Receiving the response in a PC5-RRC message, and/or via a relayed DL Uu SRB/RLC channels, and/or directly via Uu
  a. For example, a remote WTRU may expect/receive a response to an SI request using a PC5-RRC message when the relay WTRU is in RRC_IDLE/RRC_INACTIVE, and may expect/receive a response to an SI request using a relayed SL-RLC channel (associated with Uu DL transmissions) when the relay WTRU is in RRC_CONNECTED.
  b. For example, whether the response is received in a PC5-RRC message, or via a relayed DL RLC channel associated with Uu may depend on the method/mechanism used by the remote WTRU for sending the SI request, and hence on some factors described herein A WTRU may determine one or a number of factors to determine the mechanism for transmitting the SI request and/or receiving the SI following the request, as follows:

Based on (State) Information from Relay

A remote WTRU may determine the mechanism for sending SI request (e.g. when connected to a relay WTRU) based on information provided by the relay WTRU. Such information, for example, may directly or indirectly inform the remote WTRU of the relay WTRU's RRC state. Specifically, a remote WTRU may use a first mechanism to send SI request and/or receive the requested SI if the relay WTRU is in RRC_CONNECTED, and may use a second mechanism to send SI request and/or receive the requested SI if the relay WTRU is in RRC_IDLE/RRC_INACTIVE. A remote WTRU may determine the state of the relay WTRU and/or the required mechanism for sending SI request based on any of the following:

Explicit information transmitted by the relay WTRU
  a. For example, the relay WTRU may transmit a state indication or equivalent to the remote WTRU. Such may be transmitted
    i. upon a transition from one state to another state (e.g. a PC5-RRC message or a PC5 MAC CE indicating a state or state change to the remote WTRU).
  b. Such may be transmitted periodically by the relay WTRU (e.g. a periodic PC5-RRC message with the current relay state).
  c. Such may be transmitted along with other relay WTRU transmissions
    i. For example, a relay WTRU may include a MAC CE with its own transmissions, possibly when the relay WTRU's Uu state has changed
    ii. For example, a relay WTRU may include the state information with the Uu SI broadcast/transmitted to its remote WTRU
    iii. For example, a relay WTRU may include its state information with Uu within its discovery transmissions
    iv. For example, a relay WTRU may include its state information with Uu within its SL RSRP measurement reports Implicitly based on some property of the relay WTRU's transmissions to the remote WTRU
  a. For example, a relay WTRU may indicate its Uu state as part of a property or contents of its own transmissions (e.g. data transmissions, discovery transmissions, etc). For example, a relay WTRU may select its resources for discovery, data, or other transmissions based on its Uu state. For example, a relay WTRU may transmit discovery message with a periodicity which depends on its Uu state. For example, a relay WTRU may include a L2 ID for broadcasting SI in its discovery message when the relay WTRU is in RRC_IDLE/RRC_INACTIVE.

Based on the established/existing SL bearers at the relay and/or remote WTRU
  a. For example, a relay WTRU may establish a SL bearer (e.g. a SL SRB, a relayed RLC channel, or similar) and signal the establishment of such bearer/RLC channel to the remote WTRU, and such upon establishing/resuming a Uu RRC connection. Conversely, a relay WTRU may release such bearer/RLC channel, and indicate such to the remote WTRU, upon the relay WTRU being released to RRC_IDLE/RRC_INACTIVE. In such example, a remote WTRU may determine the RRC state of its relay WTRU (and hence the mechanism for transmitting the SI request) based on the presence/absence of such SL bearer RLC channel. A remote WTRU may further create/release a corresponding transmission SL bearer/RLC channel for transmission upon reception of such indication from the relay WTRU.

A remote WTRU may use the state information from the relay WTRU to determine the mechanism to use for sending the SI request, or receive the response.

For example, a remote WTRU may transmit an SI request using a PC5-RRC message (on a non-relayed PC5 SLRB) when the relay WTRU is in RRC_IDLE/RRC_INACTIVE. Alternatively, a remote WTRU may transmit an SI request using a relayed Uu SRB (e.g. SRB0 relayed via a SL RLC channel) when the relay WTRU is in RRC_CONNECTED.

Based on Remote WTRU Coverage Condition

A remote WTRU may determine its mechanism for sending an SI request to/via the relay WTRU based on its own coverage condition, which may encompass any of the following:
  Whether the remote WTRU is in coverage or out of coverage of Uu
  Whether the remote WTRU is in coverage or out of coverage of a gNB that provides relay and/or sidelink configuration
  Whether the remote WTRU is in coverage or out of coverage of the same cell/cell group as the relay WTRU via which the SI request is being sent
  Some condition related to the measurements of the cell in which the remote WTRU is in coverage of and/or the measurements on sidelink, possibly of the relay WTRU to which the remote WTRU is connected to or requesting SI from. For example, if the remote WTRU is in coverage of the same cell as the cell it is connected to via the relay, or the same cell that its relay WTRU is connected/camped, the remote WTRU may request SI using a PC5-RRC message. Alternatively, if the remote WTRU is in coverage of a different cell compared to the relay WTRU cell, the remote WTRU may send the SI request using a Uu RRC message on a relayed SL RLC channel.

For example, if the remote WTRU is in coverage of a different cell compared to the relay WTRU, and RSRP measurements of the cell satisfy a configured condition, the remote WTRU may send the SI request to the network directly via Uu.

Based on the Type of Service and/or the QoS Associated with Such Service

A remote WTRU may determine its mechanism for sending an SI request based on the type of service currently active at the WTRU and/or the service it is sending the SI request for. Specifically, the WTRU may be configured with certain services for which SI request be sent directly via Uu, whether it may be configured with certain services for which the SI request is sent via the relay WTRU. For example, a WTRU may transmit an SI request directly via Uu if configured with one or more bearers of a particular priority or QoS.

Based on Uu/SL Connection Status

A remote WTRU may determine its mechanism for sending SI request based on its connection status with Uu and/or sidelink and/or whether it is configured to transmit/receive a service simultaneously on Uu and PC5. For example, a WTRU may transmit an SI request on Uu if it has at least one Uu bearer that is being transmitted directly via the Uu interface (as opposed to relayed via a relay WTRU).

Based on Network Configuration

For example, a remote WTRU may be configured as to whether to transmit SI request using PC5-RRC message, or Uu RRC message via a relay SL RLC channel. Such configuration may further be implicit in whether the WTRU is configured with a SL RLC channel dedicated for transmission of the Uu RRC message.

Based on the WTRU Type/WTRU Capabilities

A remote WTRU may determine the mechanism for transmitting the SI request and/or receiving SI based on the WTRU type and/or the WTRU's capabilities. For example, a remote WTRU with certain capabilities may be allowed to transmit SI request directly on Uu, possibly based on other conditions.

Relay WTRU Behavior Upon Receiving an SI Request from a Remote WTRU

A relay WTRU may receive an SI request from a remote WTRU. Such SI request may be in a PC5-RRC message, or may be distinguished by the relay WTRU using any mechanism described above for transmission of the request by the remote WTRU. For example, a relay WTRU may create one or more dedicated SL RLC channel or LCH associated with reception of SI requests, and may trigger any of the behavior associated with reception of SI request upon reception of a message on such SL RLC channel. For example, a relay WTRU may trigger any behavior associated with reception of an SI request upon reception of a message on such SL RLC channel.

A relay WTRU may perform any or a combination of the following upon reception of an SI request from a remote WTRU:

Perform a Uu state transition, depending on the relay's own RRC state
  a. For example, a relay WTRU, upon reception of an SI request while in RRC_IDLE or RRC_INACTIVE, may transition to RRC_CONNECTED. On the other hand, if the relay WTRU is in RRC_CONNECTED, the relay WTRU may simply relay the SI request message without taking further action.

Initiate a Uu SI request and/or forward the request, possibly depending on its own Uu state, possibly depending on whether the WTRU has the requested SI(s) stored
  a. A relay WTRU may perform an SI request via Uu upon reception of an SI request from a relay WTRU. Such behavior may further depend on the relay WTRU's RRC state. Such request may be performed only in the case the relay WTRU does not already have the requested SI(s) stored
    i. For example, a relay WTRU may initiate a Uu SI request when the relay WTRU is in RRC_IDLE/RRC_INACTIVE. On the other hand, a relay WTRU may ignore the SI request from the remote WTRU or forward the SI request to the network if the relay WTRU is in RRC_CONNECTED. For example, a relay WTRU may create/be configured with a SL RLC channel for reception of an SI request message from the remote WTRU. If the relay WTRU is in RRC_IDLE/RRC_INACTIVE, the relay WTRU may initiate an SI request via Uu upon reception of a message from such SL RLC channel. On the other hand, if the relay WTRU is in RRC_CONNECTED, the relay WTRU may forward the message on the SL RLC channel to a Uu RLC channel.
    ii. For example, a relay WTRU in IDLE/INACTIVE may check if it has a valid version of the SI stored (by checking SIB1) upon reception of the SI. If it has a valid version, the relay WTRU may send the SI to the remote WTRU. Otherwise, the relay WTRU may initiate an SI request over Uu.

Buffer SI requests by multiple remote WTRUs before performing Uu SI request
  a. For example, a relay WTRU may buffer/maintain all SI requests received from connected/remote WTRUs, possibly for a period of time. For example, a relay WTRU may start a timer upon reception of a first SI request. A relay WTRU may accumulate all SI requests received while the timer is running. Upon expiry of the timer, the relay WTRU may send a Uu SI request, including all requested SIs from remote WTRUs accumulated during the timer. For example, a relay WTRU may accumulate all SI requests received by remote WTRUs during a predefined period on Uu (e.g. one or multiple modification periods) or SL (e.g. one or multiple SL DRX cycle, SL modification periods, or similarly defined interval of time).

Ignore/drop an SI request if a similar SI request was made by another remote WTRU
  a. For example, a relay WTRU may ignore/drop an SI request if the SI(s) requested by the remote WTRU were requested by another remote WTRU, possibly within some past period of time Ignore/drop an SI request if the requested SI is currently being broadcasted
  a. For example, a relay WTRU may ignore/drop an SI request if the SI(s) requested by the remote WTRU are currently associated with SI that is being broadcast by the network (e.g. the si-broadcastStatus in SIB1 is set)

Add the requested SI as an interested SI for the remote WTRU, as defined herein

Start monitoring/sending Uu SI which change their broadcast status
- a. For example, a relay WTRU may determine, at some time following reception of an SI request (possibly without indication of which SI are requested) which NW broadcasted SI has changed its SI broadcast status to "broadcast". The period of time may correspond to one or more SI modification periods. The period of time may correspond to the expiry of a timer set following reception of the SI request. The relay WTRU may then send these SI to the remote WTRU(s) which have sent the SI request. Alternatively, the relay WTRU may broadcast/groupcast these SI on PC5.

Send all SI being broadcast by the NW, possibly after a specific period of time
- a. For example a relay WTRU may trigger the transmission of a subset or all SI broadcast by the NW, as determined following some period of time after the reception of the SI request. Such time may be a number of modification periods, or correspond to the expiry of a timer.

Translate an SI request message into a SIB request message, or vice versa
- a. For example, a relay WTRU may receive an SI request message from a remote WTRU and may transmit a corresponding SIB request message, indicating all SIBs in the corresponding SI. The relay WTRU may perform such translation, for example, when the relay WTRU receives the SI request while in RRC_CONNECTED.

Relay WTRU is Configured with a Dedicated SL RLC Channel that Triggers a Uu SI Request According to an embodiment, a relay WTRU may be configured with a dedicated SL RLC channel that triggers an SI request. Specifically, a relay WTRU may trigger an SI request (e.g. MSG1-based RACH procedure, MSG3-based RACH procedure, or transmission of a dedicatedSIBRequest message) upon reception of a PDU associated with the dedicated RLC channel, or some time following reception of a PDU associated with the dedicated RLC channel.

Relay WTRU Uses Information in the Received SI Request to Trigger a Uu SI Request A relay WTRU may further derive the contents of the SI request from the information in the received SI request, possibly in addition to other information it may generate.

Relay WTRU generates a dedicatedSIBRequest from a received SI request
- a. According to an embodiment, a relay WTRU may derive the requested SIBs from the SI messages requested by the remote WTRU(s). Specifically, the relay WTRU may include all the SIBs associated with the SI(s) requested by the remote WTRU(s) in the dedicatedSIBRequest message Relay WTRU uses the PDU/request message received from the remote WTRU as part of the payload of the SI request
- a. According to an embodiment, a relay WTRU may create an SI request RRC message (e.g. MSG3-based SI request message, or dedicatedSIBRequest message) by transparently including the PDU (in the case of a relayed SL RLC message) or request message (e.g. PC5-RRC message) within its own SI request message. A relay WTRU may further indicate the presence of such transparently included PDU or request message in its own SI request message on Uu, either through an RRC message type (e.g. new RRC message) or by including an explicit indication in the SI request RRC message.
- b. A relay WTRU may further include, possibly, SIs it wishes to request along with the SI's requested by the remote WTRU. Any additional SI's requested by the relay WTRU itself may use the legacy mechanism of indicating the SI requested—i.e. a bitmap of the SIs.

Relay WTRU includes the identity of the requesting remote WTRU(s)
- a. A relay WTRU may include, in the Uu SI request message, the ID of the remote WTRU(s) (e.g. L2 ID, C-RNTI, remote WTRU ID, or similar) that requested SI Relay WTRU includes requested SI from multiple remote WTRUs in a single Uu SI request
- a. A relay WTRU may include, in its SI/SIB request, the requested SIBs/SIs of all remote WTRUs which have sent an SI request to the remote WTRU, possibly within a recent period of time.
- b. Alternatively, a relay WTRU may include, in its own SI request RRC message (e.g. MSG3-based SI request or dedicatedSIBRequest), the payload of the SI/SIB request received from the remote WTRU(s). Specifically, a relay WTRU may create an SI/SIB request RRC message which includes, as one or more transparent container(s), the payload of the SI/SIB request message received on the dedicated SL RLC channel, possibly from multiple remote WTRUs, Relay WTRU Determines the Type of Uu SI Request to Make Following Reception of a SL SI Request A relay WTRU may initiate/transmit an SI request/procedure to the network when receiving an SI request from a remote. A relay WTRU may use any of the following for transmitting the SI request:
dedicatedSIBRequest
MSG1-based SI request, or MGS3-based SI request
A WTRU may determine which type of SI request to use, based on a number of factors. Such factors may further determine whether the relay WTRU should perform a connection establishment/resume procedure in order to send on type of SI request over another (e.g. to be able to send a dedicatedSIBRequest.

A relay WTRU may determine the type of SI request based on any or a combination of:

The RRC state of the relay WTRU
- a. For example, a relay WTRU may use dedicatedSIBRequest to send the requested SI from the remote WTRU(s) when the relay WTRU is in RRC_CONNECTED, and may use MSG1 or MSG3 based SI request when the relay WTRU is in RRC_IDLE/RRC_INACTIVE.

The cell ID/area ID (possibly associated with a group of cells) to which the remote WTRU is in coverage of, provided by the remote WTRU in its SI request
- a. For example, a relay WTRU may determine the type of SI request based on the cell ID or area ID provided by the remote WTRU, which may represent the cell or area which the remote WTRU is in coverage of, as well as whether such cell ID/area ID is the same as the cell ID/area ID of the cell to which the relay WTRU is connected/camped.
- b. For example, if the relay WTRU is camped to the same cell as the coverage cell of the remote WTRU, the relay WTRU may transmit a MSG1-based or MSG3-based SI request. Alternatively, if the relay WTRU is camped to a different cell or a cell broadcasting a different area ID than the remote WTRU's coverage cell, the relay WTRU may initiate an RRC connection/resume and/or request SI using a dedicatedSIBRequest message.

The coverage status (IC or OOC) and/or measurements provided by the remote WTRU
  a. For example, a relay WTRU may perform dedicatedSIBRequest in RRC_CONNECTED for a remote WTRU OOC, and may perform MSG1/MSG3-based SI request for a remote WTRU in coverage
  b. For example, a relay WTRU may determine the type of request based on whether the measurements (measurements of a cell on Uu, or sidelink measurements) provided by the remote WTRU are above/below a threshold. Such measurements may be provided in the request, or in another message prior to the request The number of remote WTRUs, the number of remote WTRU's requesting SI, or the number of SI requests received, possibly over a period of time
  a. For example, a relay WTRU may select whether to use MSG1-based or MSG3-based SI request depending on the number of remote WTRUs, the number of SIs being sent, the number of remote WTRUs having requesting SI, or some other factors related to the SI request(s) made by the remote WTRU(s).

Alternatively, a relay WTRU may always use one type of request (e.g. MSG3-based SI request when in RRC_IDLE/RRC_INACTIVE) wherever such request is triggered by the request sent by a remote WTRU.

Relay WTRU Determines the Parameters Associated with the Uu SI Request from a Remote WTRU SI Request A relay WTRU may determine the parameters of the Uu SI request based on the reception of the SI request from one or more remote WTRUs. The parameters associated with the SI request may include one or any of:
  The preamble, or set of preambles which can be used for the SI request
  The number of repetitions associated with sending the SI request
  The initial transmit power (e.g. for transmitting the RACH)
  The beam configuration, or selected beam for performing RACH procedure
  The specific UL resource for transmitting the SI request (e.g. specific configured grant, specific carrier,
  Inclusion of additional information in the SI request or along with transmission of the SI request, such as an RRC IE transmitted within the SI request message, a MAC CE or additional RRC message multiplexed along with the SI request message, Selection of such parameters may be used to indicate, to the gNB, any of:
  That the SI request is triggered by a remote WTRU (rather than the relay WTRU itself)
  That the SI request is associated with a specific remote WTRU
  That the SI request is performed by a WTRU in coverage or out of coverage
  That the SI request is performed by a WTRU that is in coverage of the same cell or different cell compared to the relay WTRU
  That the SI request is associated with a specific priority, QoS, SLRB configuration, or similar which may indicate the importance/criticality/latency required for the SI delivery
  That the SI request is associated with a specific SL monitoring (e.g. SL DRX) schedule for the remote WTRU For example, a relay WTRU may be configured with one or more dedicated preambles associated with transmitting SI request that is triggered by reception of an SI request from a remote WTRU.

Remote WTRU Receives a Response to an SI Request on Dedicated SL RLC Bearer

A remote WTRU may receive responses to an SI request (e.g. performed on Uu SRB0, and relayed via a PC5-connected relay WTRU) on a dedicated SL RLC bearer. Such dedicated SL RLC bearer may have a (pre)configured SL RLC configuration for reception. Alternatively, the remote WTRU may receive such dedicated SL RLC bearer configuration from the relay WTRU.

The relay WTRU may receive the TX/RX configuration for such SL RLC bearer from the network (e.g. in dedicated RRC signaling). The relay WTRU (e.g. in RRC_CONNECTED) may map a dedicated Uu RLC bearer (for sending SI responses) to such SL RLC bearer. Alternatively, the relay WTRU may route all RRC messages it receives which are indicated as being destined to the remote WTRU to such SL RLC bearer.

A remote WTRU may send an SI request message (e.g. similar to the MSG3-based SI request RRC message) on relayed Uu SRB0. The remote WTRU may send such SI request message only when the remote WTRU is in RRC_IDLE/RRC_INACTIVE. In response, the remote WTRU may receive (e.g. in a Uu RRC message), on the dedicated SL RLC bearer for reception, any of the following:
  A Uu RRC message containing the requested SIBs/SI, or subset of the requested SIBs/SI
  An acknowledgement message, indicating the SI request was successfully received by the network
  An indication that the requested SI should be received directly via Uu
    a. For example, the remote WTRU, upon reception of such indication in the response, may monitor the Uu interface for the requested SI A remote WTRU may expect a response to an SI request:
  Immediately, or a specific time period following a request
  One or more SL-DRX cycles following the request
  One or more modification periods following the request.

A remote WTRU may retransmit an SI request if a response is not received within the expected response time.

Remote WTRU Creates a Dedicated SL RLC Bearer

According to an embodiment, a remote WTRU may create a dedicated SL RLC bearer associated with reception of a response to an SI request. A remote WTRU may create such SL RLC bearer based on trigger from the relay WTRU. For example, the remote WTRU may create such SL RLC bearer for reception following reception of a configuration message, by the relay WTRU, which configures the SL RLC bearer for transmission at the relay WTRU. For example, the remote WTRU may create such SL RLC bearer for reception following indication (explicit or implicit) from the relay WTRU that the relay WTRU is in (or has transitioned to) RRC_CONNECTED. A remote WTRU may maintain such RLC bearer as long as the remote WTRU is in RRC_IDLE/RRC_INACTIVE. For example, a remote WTRU in RRC- _CONNECTED may release such bearer, and rely on SL RLC bearer which relays SRB1 traffic for request and response of SI.

Remote WTRU Determines how to Receive SI Request Response (e.g. SI) Based on Presence of Dedicated SL RLC Bearer A remote WTRU may determine how to receive response to an SI request based on the presence of such dedicated SL RLC bearer. Specifically, a remote WTRU may receive an SI request response via PC5-RRC message from the relay WTRU in case a dedicated SL RLC bearer for reception of such response is not created. Alternatively, the remote WTRU may receive SI request response via an SL RLC bearer for Uu signaling if such RLC bearer exists at the remote WTRU.

Relay WTRU Obtains SL Resources for Transmitting SI on Sidelink

Dedicated SR for Obtaining SL Resources

A relay WTRU may be configured with one or more dedicated SR for obtaining SL resources (in mode 1) for transmitting SI. Specifically, a relay WTRU may transmit SR on Uu when it needs to transmit SI on sidelink to one or more remote WTRUs. In one example, a relay WTRU may be configured with a single SR resource.

Multiple Dedicated SR Resources, Each Associated with an Element of Size of SL Transmission In another example, a WTRU may be configured with multiple SR resources where each SR resource is used for a given:
  Number of remote WTRUs that have requested SI
  Number of different SI(s) that have been requested by one or more remote WTRUs
  Size of the SI(s) requested, or amount of sidelink resources required by the relay WTRU to transmit the SI on sidelink The relay WTRU may trigger SR upon any or a combination of the following:
  SR triggered upon reception of SI request: The relay WTRU receives an SI request from one or more remote WTRUs. The relay WTRU may receive an SI request using any of the methods described herein for the remote WTRU to transmit the SI request so that it is visible to the relay WTRU.
    a. For example, the relay WTRU may trigger SR upon reception of a first SI request. SR Prohibit timer specific to SI Request: To avoid triggering multiple SRs, the relay WTRU may be configured with an SR prohibit timer specific to SI request. Specifically, the relay may then start a timer, where such timer is specific to the SI request SR. The relay WTRU may avoid triggering additional SR transmissions upon reception of subsequent SI requests from other remote WTRUs while the timer is running.
  SR triggered some time following SI request: Upon expiry of a timer, started following the reception of a first SI request, or after a (pre)configured time following reception of a first SI request from a remote WTRU. Specifically, a relay WTRU may start a timer following reception of a first SI request message. The relay WTRU may then transmit the SR when the timer expires. Alternatively, the relay WTRU may transmit the SR some fixed/relative time following the reception of the SI request, where such time may further depend on the SI modification period, the request SI, or the DRX configuration on sidelink
  SR triggered following determination by the relay of a need to transmit SI on sidelink: The relay WTRU determines a need to transmit the SI on sidelink. Specifically, a relay WTRU may transmit the SR when, or as a result of:
    a. The relay WTRU detects a change in a SI (e.g. change in value tag) broadcast by the network
    b. The relay WTRU detects a change in a relay specific SI, and the relay WTRU is configured to send only relay specific SI to its remote WTRU(s)
    c. A periodic timer. Specifically, a relay WTRU may transmit broadcast SI from the cell periodically on sidelink and may trigger SR according to the same period
    d. The relay WTRU detects a change in the broadcast status (e.g. broadcast vs non-broadcast) of a specific SI by the network WTRU Includes the Amount of Data for SI Transmission on Sidelink in BSR Alternatively, the relay WTRU may request resources using BSR, where the size of the SI to be transmitted may be added to the buffer status of one or more logical channels on sidelink. Alternatively, the relay WTRU may be configured with a dedicated logical channel for transmission of SI. For example, a WTRU may be configured with a LCH for each remote WTRU (i.e. each unicast link and/or pair of source/destination ID). Alternatively, a WTRU may be configured with a LCH associated with a broadcast/groupcast L2 ID. Such broadcast/groupcast L2 ID may be for transmission of SI on sidelink to all connected remote WTRUs.

WTRU is Configured with One or More Sidelink CG(s) for SI Transmission

According to an embodiment, a WTRU may be configured with one or more sidelink CGs for SI transmission. A WTRU may be configured to transmit SI over sidelink using the resources of such CG(s). For example, a WTRU may be configured with a LCH restriction which maps only data from the dedicated sidelink logical channel for SI to such CG(s). For example, a WTRU may be configured with an LCH restriction which does not allow LCHs which are not associated with transmission of SI over sidelink to use such CGs.

A WTRU may be configured to activate such SL CG upon the need for transmission of the SI on sidelink. Specifically, a WTRU may activate a SL CG upon:
  Reception of an SI request from a remote WTRU, using any of the methods described herein for the remote WTRU transmitting the SI request such that it is visible at the relay WTRU
    a. A WTRU may further activate the SL CG upon the first SI request of a number of consecutive SI requests received (e.g. based on the use of a timer, as described elsewhere herein)
  Transmission of an SI request on Uu, where such SI request is performed on behalf of a remote WTRU (e.g. as a result of receiving an SI request on sidelink, or upon determining that SI should be transmitted on sidelink)
  Reception of an acknowledgement to such an SI request transmitted on Uu
  Some (pre)configured or predefined time following any of the above
    a. Such time may be a function of the SI modification period, possibly on Uu. For example, a WTRU may activate a CG in the modification period following the transmission of the SI request. For example, a WTRU may activate a CG in the modification period in which the WTRU monitors the SI on Uu, following the SI request.

Some (pre)configured or predefined time relative to the SI broadcast on Uu
  a. For example, a WTRU may activate a SL configured grant immediately, or some (pre)configured or predefined time following the modification period associated with one or more SI, possibly for the modification period in which the NW starts to broadcast a specific SI (i.e. the broadcast bit in SIB1 for the SI is toggled).

A WTRU may assume a SL CG remains active for a finite period of time following activation. For example, a WTRU may be (pre)configured with a timer, which is started at the activation of a CG. Upon expiry of the timer, the WTRU may disable/deactivate the SL CG. For example, a WTRU may activate one or more single transmission opportunity(ies) of a SL CG upon any of the triggers mentioned above. For example, a WTRU relay WTRU may deactivate a SL CG when the network stops broadcasting a specific SI (e.g. the broadcast bit in SIB1 for the SI is toggled).

A WTRU may be configured with multiple CGs, as well as an association of a factor related to the SI requested/broadcast and the CGs. The WTRU may then activate the specific CG(s) based on such association. Specifically, a WTRU may be configured with a CG to be used for a given:
  Number of remote WTRUs that have requested SI
  Number of different SIs that have been requested by one or more remote WTRUs
  Size of the SI(s) requested, or amount of sidelink resources required by the relay WTRU to transmit the SI on sidelink WTRU Receives a SL Grant for SI Transmission as Part of the SI Request Procedure According to an embodiment, a relay WTRU may receive a SL grant for SI transmission during the Uu SI request procedure. Specifically, a WTRU may receive such SL grant
  In MSG2/MSG4 of the SI request procedure
    a. Specifically, a relay WTRU may trigger an SI request procedure based on RACH (e.g. MSG1-based or MSG3-based) and may receive the SL grant for transmission of the SI on sidelink
  In the DCI scheduling the SI transmission on Uu
    a. Specifically, a relay WTRU may receive SI via dedicated signaling. In the grant providing the SI to the relay WTRU, a relay WTRU may further receive a SL grant to use for transmission of the SI on sidelink
  In a MAC CE on Uu
    a. Specifically, a relay WTRU may receive SI via dedicated signaling. In the grant providing the SI to the relay WTRU, or another grant on DL, a relay WTRU may further receive a MAC CE containing a SL grant for transmission of the SI WTRU Triggers Resource (Re) Selection for Transmission of SI on Sidelink According to an embodiment, a WTRU may trigger resource (re) selection for transmission on sidelink of SI received from a cell. A WTRU may trigger selection if the WTRU does not have resources for transmission of the SI. The WTRU may use a one-shot resource for transmission of the SI. Alternatively, the WTRU may use multiple resource (a periodic set of resources) for transmission of the SI to one or multiple of its remote WTRUs. A WTRU may trigger such resource (re) selection based on any of the triggers for sending SI on sidelink provided herein. Furthermore, a relay WTRU may trigger resource reselection if any of the following conditions are met:

An existing SL process does not coincide with the SL DRX timing of the remote WTRU to which the SL SI needs to be transmitted An existing SL process does not coincide with the timing of the Uu SI reception time
  a. Specifically, a relay WTRU may trigger resource reselection in order to align the SL transmission time to the Uu reception of the SI, based on the Uu SI modification period/SI window Relay WTRU Transmits SI on Sidelink Using a SL SRB According to an embodiment, a relay WTRU may create a SL SRB for transmission of SI on sidelink. Such SL SRB may be the same SL SRB used for PC5-RRC signaling (e.g. for PC5 reconfiguration message). Alternatively, the relay WTRU may create a dedicated SL SRB or SL RLC channel for transmission of SI on sidelink. A relay WTRU may create such SL SRB/SL RLC channel when the relay WTRU is in/transitions to Uu RRC_IDLE/RRC_INACTIVE, and may release such SL SRB/SL RLC channel when the relay WTRU is in RRC_CONNECTED.

A relay WTRU may transmit SI individually to each connected remote WTRU (i.e. all remote WTRU's to which the relay WTRU has an established unicast link). A relay WTRU may determine the connected remote WTRUs based on the list of L2 source/destination ID pairs associated with unicast links specific for relaying only. Alternatively, the relay WTRU may maintain a local list of physical WTRU IDs, which may be assigned to each remote WTRU (e.g. during link establishment/configuration). A relay WTRU may use one of the L2 IDs associated with each physical WTRU to transmit the SI to a given remote WTRU. Alternatively, a relay WTRU may send the SI in groupcast to all remote WTRUs.

A relay WTRU may maintain/use one or more dedicated L2 source and/or destination ID pairs for transmission of the SI messages, possibly for each remote WTRU, and use the ID(s) for transmission on the SI message over sidelink. For example, a source/destination pair may be configured for each remote WTRU. The same or different source/destination pair may be used for each remote WTRU. Alternatively, a WTRU may be configured with a groupcast L2 destination for broadcasting the SI to the remote WTRUs. A remote WTRU may be configured to monitor transmissions with such source and/or destination ID(s) to receive SI from one or more relay WTRUs.

Triggers for Sending SI on Sidelink

A relay WTRU may send SI to one or more remote WTRUs based on any of the following triggers:
  Upon establishment of a PC5-RRC connection with a remote WTRU for relaying
    a. For example, upon establishment of a PC5-RRC connection for relaying, a relay WTRU may send a PC5-RRC message containing all/part of the SI received by the relay WTRU from the cell
  Upon reception of a PC5-RRC reconfiguration message from the remote WTRU, possibly the first configuration message, possibly a configuration message that indicates the interested SI
  Upon request by a remote WTRU
  Periodically, where such period may depend on
    a. The modification period of the SI on Uu
    b. The DRX configuration of the remote/relay WTRU c. Some (pre)configured or predetermined period
d. A period which depends on
  i. The SL QoS/SLRB configuration of the remote/relay WTRU
  ii. The measured CBR
    1. Specifically, the relay WTRU may determine the periodicity of broadcast SI based on the measured CBR and may transmit with a larger period in case of larger CBR
  iii. The access category/class of the remote WTRU(s)

Relay Extracts a Portion of the SI to Transmit in the Discovery Message

A relay WTRU may broadcast a part of the Uu SI on the discovery message. A relay WTRU may extract such information from the SI received from the cell and include it in the discovery message. Such may include any of (but not limited to):
  The cell ID
  The PLMN ID
  RAN area ID
  Access control parameters A relay WTRU may further exclude such information in the dedicated transmissions of SI to its remote WTRU(s).

Relay Broadcasts Information Required by Remote WTRU to be Able to Read the System Information A relay WTRU may broadcast (e.g. in discovery message and/or other message on SL) information for the remote WTRUs to be able to receive/decode/interpret SI. Such information may include, but not be limited to:
  L2 addresses for receiving the system information from a particular relay
    a. For example, a relay WTRU may be configured (e.g. by upper layers) with a L2 source and/or destination ID(s) for transmitting system information. A remote WTRU, upon receiving discovery message from a relay WTRU, may store the L2 source and/or destination ID(s) and use them to receive SI from that specific relay WTRU. The remote WTRU may maintain an association between the L2 source and/or destination ID(s) of the relay WTRU (e.g. transmitted in the discovery message) and the L2 source and/or destination ID(s) to be used for receiving SI from that relay WTRU
  Time/frequency resources in which the remote WTRU may read the SI (e.g. DRX cycle)
    a. For example, a relay WTRU may determine a set of time/frequency resources for transmission of the SI (as described herein) and may indicate such time/frequency resources within the discovery message. For example, a relay WTRU may select a timeslot and periodicity for SI transmissions which fall within the SL DRX cycle/pattern of the relay WTRU. The relay WTRU may transmit such indication of the resources and/or the SL DRX cycle/pattern in the relay WTRU's discovery message
  Value tag or identifier
    a. For example, a relay WTRU may broadcast an identifier with each version of one or a group of SI. A relay WTRU may determine the value of such identifier, for example, based on whether it determines a change in the relay specific elements of SI, as described herein. Alternatively, the relay WTRU may transmit the same tag, or a function of the tag received from the SI on Uu.

A relay WTRU may transmit SI during a specific time window which may depend on:
  The L2 ID of the relay WTRU
  The DRX cycle (on period) of the relay WTRU or remote WTRU
  An implicit/explicit time indication (e.g. offset) indicated in a periodic message by the relay, such as a discovery message
  Whether an SI tag has changed or not
    a. For example, a relay WTRU may always transmit SI when the broadcasted SI tag has changed
  Whether the relay WTRU has connected remote WTRUs
    a. For example, a relay WTRU may always broadcast SI at a given time period if an SI tag has changed and the relay WTRU has connected remote WTRUs Remote WTRU is Configured with a Time/Frequency Limitation for SI Request According to an embodiment, a remote WTRU may be configured with an allowable time period, or an allowable set of frequency resources in which it can transmit an SI request. For example, a remote WTRU may transmit an SI request only for a limited number of subframes after the transmission of a discovery message, the SI tag, (or similar periodic message) by the relay WTRU. The set of time/frequency resources in which a remote WTRU may transmit SI request may further depend on the relay WTRU(s) the remote WTRU is transmitting SI request on. Specifically, a remote WTRU may be configured a limit of the time/frequency resources it can transmit SI request on based on any or a combination of the following:
  Based on the on-duration of the relay WTRU, if the relay WTRU is in DRX
    a. For example, the remote WTRU may transmit SI request to a particular relay WTRU only during the relay WTRUs SL DRX on period (which may be determine via e.g. PC5-RRC signaling, or broadcast in discovery message)
  Based on a period of time relative to a periodic/regular transmission by the relay WTRU
    a. For example, the remote WTRU may be allowed to transmit SI request for a number of slots which occur relative to a transmission by the relay WTRU, where such transmission by the relay WTRU may be any of a discovery transmission, transmission of an SI tag, or a similar periodic transmission by the relay WTRU used by a remote WTRU before or after being PC5-RRC connected to the relay WTRU. For example, the remote WTRU may transmit SI request only in the X slots following such relay transmission by the remote WTRU.
  Based on an identity associated with the relay WTRU
    a. For example, the remote WTRU may derive an offset and/or number of slots from a predefined time based on the L2 ID of the relay WTRU
  Based on an offset or number of slots, or similar information provided by the relay
    a. For example, the remote WTRU may transmit such information in a discovery message or similar message Relay WTRU Broadcasts a Relayed Part of System Information According to an embodiment, a relay WTRU may transmit SI received from the cell it is associated to over sidelink. A relay WTRU may further transmit only a subset of the cell's SI, where such subset may represent the SI required for a remote WTRU to access the cell via the relay WTRU. A WTRU may further transmit the relay-subset SI unless otherwise requested, or depending on the cast-type used for transmitting the SI, or depending on the presence of a PC5-connected remote WTRU in RRC_CONNECTED. For example, a relay WTRU may broadcast the relay-subset SI in broadcast but may transmit the non-relay subset SI (e.g. to support service continuity) when requested by a remote WTRU that is PC5-RRC connected and is RRC_CONNECTED to Uu via the relay WTRU.

The relay-subset SI may consist of a set of SIBs or a set of IEs within one or multiple SIBs from the associated cell. These SIBs and/or IEs may be predefined (e.g. in the standards) or (pre)configured. For example, when transmitting an SI, a relay WTRU may transmit only a predefined subset of IEs in the SIB that is read from the cell.

A relay WTRU may determine to transmit the relay-subset SI or transmit (possibly in addition) the non-relay subset SI, depending on:
- The cast being used by the relay to transmit the SI
  a. For example, a relay WTRU may broadcast only the relay-subset SI. If the relay WTRU needs to transmit the SI in unicast, the relay may transmit both the relay-subset SI and/or the non-relay subset SI
- Whether the SI is transmitted as the result of an SI request, or whether the WTRU is PC5-RRC connected
  a. For example, a relay WTRU may transmit the non-relay-subset SI if it receives a request for SI from a PC5-RRC connected WTRU. Otherwise, the relay may transmit the relay-subset SI
- The Uu RRC state and/or PC5-RRC state of the requesting WTRU
  a. For example, a relay WTRU may broadcast the relay-subset SI if the requesting WTRU is a non-PC5-RRC connected WTRU, or if the Uu RC state of the requesting WTRU is RRC_IDLE/RRC_INACTIVE. If the requesting WTRU is a PC5-RRC connected WTRU in Uu RRC_CONNECTED, the relay WTRU may transmit (possibly in addition to the relay-subset SI) the non-relay subset SI
- The type of SI request message, or the contents of the SI request message
  a. For example, a relay WTRU may broadcast the relay-subset SI if the SI request is of a first type, and the non-relay-subset SI if the request of a second type. The request type may consist of the type of message (e.g. PC5-RRC vs MAC CE, PC5-RRC vs broadcast SL transmission, etc.)
  b. For example, a remote WTRU may request either the relay specific SI, or all cell SI, and may indicate such (whether it is requesting relay specific or all cell SI) in its request message. A remote WTRU may further be configured with conditions as to when/whether it should request relay specific SI or all SI. For example, such conditions may depend on:
     i. The coverage conditions of the remote WTRU
        1. For example, the remote WTRU may request all cell SI when the remote WTRU is in coverage, and it may request only the relaying part of SI when the remote WTRU is out of coverage
     ii. The cell ID of the cell to which the relay WTRU is connected
        1. For example, the remote WTRU may request all cell SI if the remote WTRU is in coverage of the same cell under which the relay WTRU is connected/in coverage. Otherwise, the remote WTRU may request only the relaying part of the SI Relay WTRU Determines/Broadcasts an SI Tag A relay WTRU may broadcast an SI tag associated with the SI it obtains from its associated cell. A relay WTRU may periodically broadcast the SI tag in any periodic transmission described herein (e.g. discovery message).

A relay WTRU may increment/change the SI tag upon any of the following:
- The relay WTRU performs cell mobility (cell reselection to a different cell or HO to a different cell)
- The relayed part of the SI in the associated cell has changed
- The relay WTRU changes its RRC state
- The relay WTRU changes from being a relay to not being a relay or vice versa A relay WTRU may transmit part or all of the SI of its associated cell when it changes its SI tag. For example, the relay WTRU may decide to transmit only the part of the SI that resulted in the change in SI tag following the change in SI tag.

Relay WTRU Transmits Updated SI to a Remote WTRU Based on Known/Interested SIBs/SI According to an embodiment, a relay WTRU may transmit update SI to a remote WTRU based on known/interested SIBs/SI associated to each or all connected remote WTRUs. For example, a relay WTRU may periodically broadcast all SI which is broadcast by the network. Possibly in addition to such, the relay WTRU may broadcast all known/interested SIB/SI is a periodic fashion. Alternatively, the relay WTRU may broadcast (e.g. groupcast on SL, or transmitting in unicast to each remote WTRU) only the SI which is broadcast by the network, and transmit (e.g. in a dedicated fashion to the specific WTRU, or in broadcast fashion on SL to all remote WTRUs, or connected remote WTRUs) the on-demand SIs corresponding to interested SIBs/SI. The WTRU may transmit these on demand SI which are interested SI for certain WTRUs temporarily, or only once (upon change of any such SI).

Relay WTRU Determines Interested SI Based on Explicit Signaling

According to an embodiment, a relay WTRU may transmit any update/changed SI to a relay based on a list on known interested SIBs/SI maintained for that remote WTRU and/or multiple remote WTRUs. Specifically, a relay WTRU may maintain a list of interested SIBs/SI, either per remote WTRU, or for all of the connected remote WTRUs. A relay WTRU may obtain such interested SIBs/SI via PC5-RRC signaling with the remote WTRU. For example, the remote WTRU may provide the relay WTRU with its list of interested SIBs/SI. If such list of interested SIBs/SI changes, a remote WTRU may send a new list of interested SIBs/SI to the relay WTRU.

Relay WTRU Determines Interested SI Based on Request by the Remote WTRU Explicit Signaling Alternatively, a relay WTRU may determine the list of interested SI, possibly for a specific remote WTRU, based on requests of the SI from the remote WTRU. For example, a relay WTRU may add a particular SI to the list of interested SI, possibly for a particular remote WTRU, upon request by a remote WTRU of that SI.

Relay WTRU Removes an Interested SI Based on Release of a Unicast Link with Remote WTRU A relay WTRU may remove a particular SI from the list of interested SI, possibly for a specific remote WTRU, upon release of a connection with a remote WTRU. A relay WTRU, if it maintains a list of interested SI for the set of remote WTRUs, may remove such interested SI only if the released remote WTRU was the last remaining WTRU for which the SI was an interested SI Relay WTRU Behavior Upon change of SI of the connected/associated cell, a relay WTRU may determine if such changed SI corresponds to any of the interested SI of one or more of its connected remote WTRUs. If it is, the relay WTRU may send the update SI to the remote WTRU(s). For example, a relay WTRU may send a unicast PC5-RRC message to the remote WTRU(s) who are interested in the SI that changed. Alternatively, a relay WTRU may send a groupcast PC5-RRC message to all of the connected remote WTRUs with the SIs corresponding to any of the interested SIs of any PC5-connected remote WTRUs.

A relay WTRU may further request SI from its connected/associated cell based on the interested SIBs of its remote WTRUs. Specifically, a relay WTRU may consider the interested SIs of the connected remote WTRUs when checking for SI changes on the connected/associated cell, and may perform SI requests to the cell on behalf of its remote WTRUs for these interested SIs. Specifically, if an on demand SI is changed (i.e. if the relay WTRU detects a change in the value tag of an SI which is not being broadcast by the network-hence on-demand), the relay WTRU may trigger an SI request of such SI. Upon reception of such SI, the relay WTRU may send the updated SI to the remote WTRU or WTRUs, possibly the specific ones which have interest for such SI.

Remote WTRU Transmits (and May Cancel) an SI Request Upon Change in the SI Tag by a Relay WTRU A remote WTRU may transmit an SI request, possibly after a change in the SI tag by that relay WTRU. A remote WTRU may transmit the SI request immediately after the change in SI tag. Alternatively, a remote WTRU may transmit an SI request a (pre)configured period of time following detection of the SI tag. Such time may depend on:
  Measured CBR on sidelink
    a. For example, the time period between the change of SI tag and the transmission of the SI request may be larger for larger CBR
  The speed of the WTRU
  The L2 ID of the remote WTRU
  The L2 ID of the relay WTRU
  A random amount of time
    b. For example, the WTRU may transmit the SI request at a random time interval following the change in the SI tag A remote WTRU trigger an SI request and may cancel such request if it detects an SI request transmission performed by another WTRU:
  Possibly associated with the same relay WTRU;
  Possibly associated with the same SI tag;
  Possibly associated with the same cell;
  Possibly associated with the same SI being requested.

Figure 4:
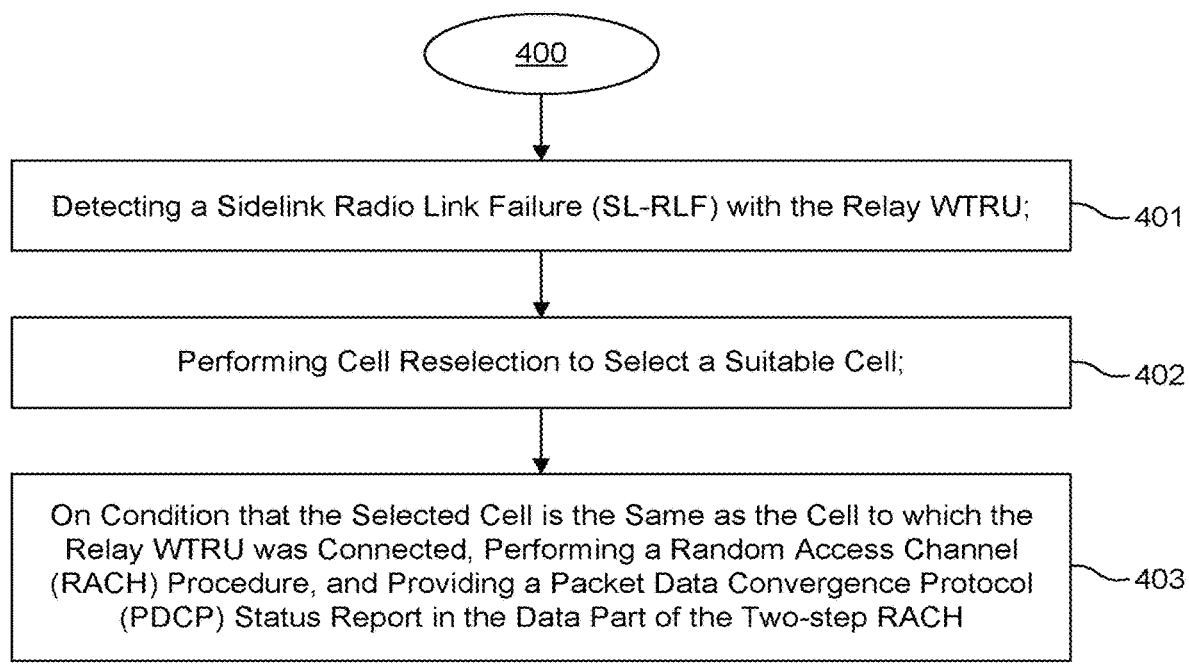
FIG. 4 is a flow chart illustrating a representative method for resuming a radio resource control connection, implemented by a WTRU.

FIG. 4 is a flow chart illustrating a representative method for resuming a radio resource control connection, implemented by a WTRU. The representative method may, for example, be implemented by a wireless transmit/receive unit (WTRU) for resuming a Radio Resource Control (RRC) connection with a network, wherein the WTRU being connected to a relay WTRU via a PC5-RRC connection, and having an active Uu RRC connection with the network via the relay.

Referring to FIG. 4, the representative method 400 may include, at block 401, detecting a Sidelink Radio Link Failure (SL-RLF) with the relay WTRU.

The representative method 400 may include, at block 402, performing cell reselection to select a suitable cell.

The representative method 400 may include, at block 403, on condition that the selected cell is the same as the cell to which the relay WTRU was connected, performing a Random Access Channel (RACH) procedure (e.g., two-step, four-step), and providing a Packet Data Convergence Protocol (PDCP) status report in the data part of the RACH.

In certain representative embodiments, the method 400 may include, on condition that the selected cell is different from the cell to which the relay WTRU was connected, and the selected cell is configured as a conditional Handover (HO) candidate, initiating a Conditional Handover (CHO) procedure to the selected cell. For example, the WTRU does not have that cell as a candidate in its conditional HO list.

In certain representative embodiments, the method 400 may include, on condition that the selected cell is different from the cell to which the relay WTRU was connected, and the selected cell is not configured as a conditional HO candidate, transitioning RRC state to RRC_INACTIVE and initiating a resume procedure with the selected cell.

In certain representative embodiments, the resume procedure may include using a dedicated Interactive Radio Network Temporary Identifier (I-RNTI) comprising an SL-RLF flag and one of the Cell-RNTI (C-RNTI) or another connected mode identifier of the WTRU. For example, 'dedicated I-RNTI' may mean that the identifier is unique to the WTRU and is allocated by the network (NW). For example, the SL-RLF flag may be in part of the I-RNTI (e.g., a preconfigured set of combination of bits) when the resume is performed following transition to INACTIVE as a result of SL-RLF.

Figure 5:
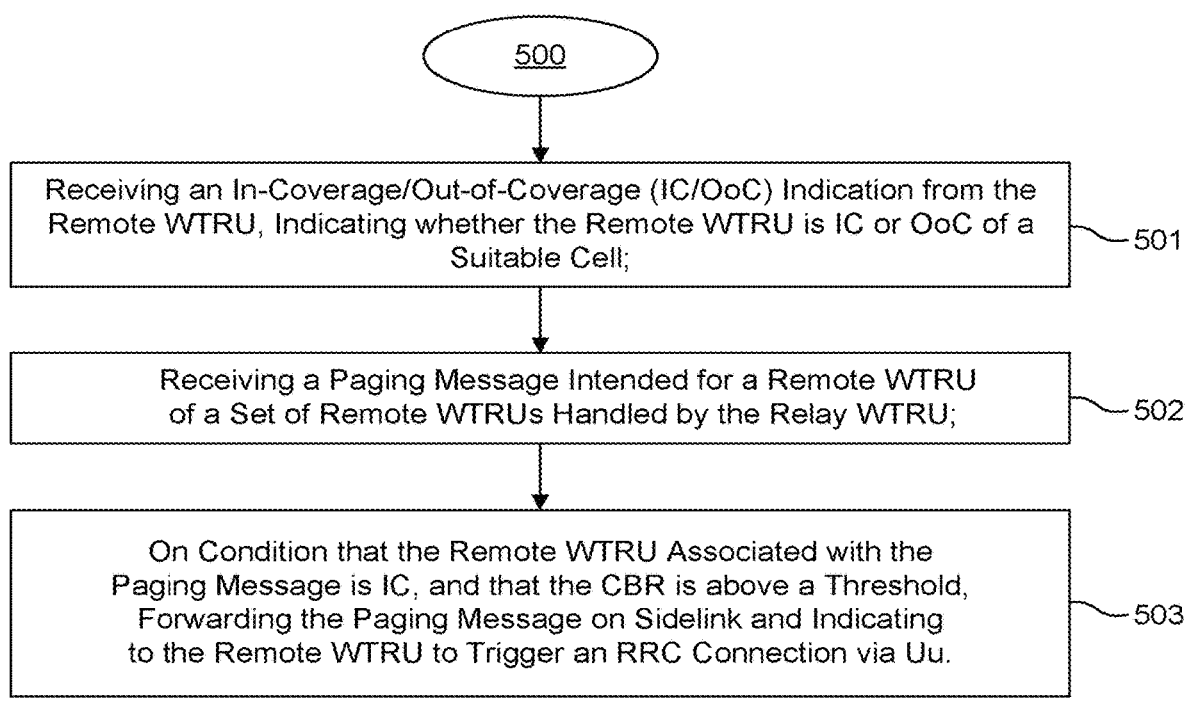
FIG. 5 is a flow chart illustrating a representative method, implemented by a relay WTRU, for determining whether a relay WTRU may serve a network-initiated connection at a remote WTRU.

FIG. 5 is a flow chart illustrating a method for determining whether a relay WTRU in RRC_INACTIVE state/inactive relay WTRU may serve a network-initiated connection at a remote WTRU based on the coverage status of the remote WTRU, on a Channel Busy Ratio (CBR), and on access control decision made by the network (e.g., indirect in the resume procedure by the relay WTRU; if the network rejects the relay WTRU, it indirectly rejects the network connection). Serving the network-initiated connection may mean that the relay will serve the connection for the remote WTRU. However, regardless whether the relay serves the connection or not, the relay may still forward the paging to the remote WTRU and make it trigger the connection. The connection is via the relay when the relay may serve it.

Referring to FIG. 5, the method 500 may include, at block 501, receiving an In-Coverage/Out-of-Coverage (IC/OoC) indication from the remote WTRU, indicating whether the remote WTRU is IC or OoC of a suitable cell.

The method 500 may include, at block 502, receiving a paging message intended for a remote WTRU of a set of remote WTRUs handled by the relay WTRU.

The method 500 may include, at block 503, on condition that the remote WTRU associated with the paging message is IC, and that the CBR is above a threshold, forwarding the paging message on Sidelink and indicating to the remote WTRU to trigger an RRC connection (with the network) via Uu.

In certain embodiments, the method 500 may include, on condition that the remote WTRU associated with the paging message is IC, and that the CBR is not above the threshold:
  transmitting a resume request message indicating a paging of an IC remote WTRU as a cause of the resume;
  on condition that a resume message is received from the network:

a. transitioning to RRC_CONNECTED/connected and forwarding the paging message on SL using a resource allocation comprised in the resume message;

on condition that a reject/release message is received from the network:

a. remaining in RRC_INACTIVE state/remaining inactive, forwarding the paging message (e.g., using Mode 2 resources) and indicating to the remote WTRU to trigger an RRC connection via Uu. Mode 2 (and Mode 1) is referring to a resource allocation mode in sidelink. Mode 1 is network scheduled resource allocation, while mode 2 is WTRU autonomous resource allocation.

In certain embodiments, the method 500 may include, on condition that the remote WTRU associated with the paging message is OoC:

transmitting a resume request message indicating a paging of an OoC remote WTRU as a cause of the resume;

on condition that a resume message is received from the network, forwarding the paging message on SL using the resource allocation provided in the resume message;

on condition that a reject/release is received from the network, dropping the remote WTRU paging message.

FIG. 6 is a flow chart illustrating a further embodiment of a method 600 for determining whether a relay WTRU in RRC_INACTIVE state/inactive relay WTRU may serve a network-initiated connection at a remote WTRU based on the coverage status of the remote WTRU, on a Channel Busy Ratio (CBR), and on access control decision made by the network (e.g., indirect in the resume procedure by the relay WTRU; if the network rejects the relay WTRU, it indirectly rejects the network connection). Serving the network-initiated connection may mean that the relay will serve the connection for the remote WTRU. However, regardless whether the relay serves the connection or not, the relay may still forward the paging to the remote WTRU and make it trigger the connection. The connection is via the relay when the relay may serve it. The method 600 for serving a paging message may be implemented by an inactive relay Wireless Receive-Transmit Unit, WTRU, e.g., by a relay in RRC_INACTIVE state. The method comprising:

receiving (601) an In-Coverage, IC, indication from a remote WTRU, indicating that the remote WTRU is IC of a suitable cell;

receiving (602) a paging message intended for a remote WTRU of a set of remote WTRUs handled by the relay WTRU; and on condition that Channel Busy Ratio, CBR, is above a threshold, forwarding (603) the paging message on Sidelink, SL, and indicating to the remote WTRU to trigger a Radio Resource Control, RRC, connection via Uu.

According to a further embodiment, the method 600 may include, on condition that the CBR is not above the threshold, transmitting a resume request message indicating a paging of an IC remote WTRU as a cause of the resume.

According to a further embodiment, the method 600 may include, after the transmitting a resume request message indicating a paging of an IC remote WTRU as a cause of the resume, on condition that a resume message is received from the network, transitioning the relay WTRU to connected and forwarding the paging message on SL using resource allocation comprised in the resume message.

According to a further embodiment, the method 600 may include, after the transmitting a resume request message indicating a paging of an IC remote WTRU as a cause of the resume, on condition that a reject (or release) message is received from the network, keeping the relay WTRU inactive (e.g., in RRC_INACTIVE state), forwarding the paging message and indicating to the remote WTRU to trigger an RRC connection via Uu.

According to an embodiment, there is also disclosed a relay wireless transmit/receive unit, WTRU, comprising circuitry comprising a receiver, a transmitter, and at least one processor, the relay WTRU being inactive (e.g., in RRC_INACTIVE state) and the circuitry being configured to: receive an In-Coverage, IC, indication from a remote WTRU, indicating that a remote WTRU is IC of a suitable cell; receive a paging message intended for a remote WTRU of a set of remote WTRUs handled by the relay WTRU; and on condition that that Channel Busy Ratio, CBR, is above a threshold, forward the paging message on Sidelink, SL, and indicate to the remote WTRU to trigger a connection, e.g., a Radio Resource Control, RRC, connection, via Uu.

According to a further embodiment of the relay WTRU, the circuitry is further configured to, on condition that the CBR is not above the threshold, transmit a resume request message indicating a paging of an IC remote WTRU as a cause of the resume.

According to a further embodiment of the relay WTRU, the circuitry is further configured to, after the transmitting a resume request message indicating a paging of an IC remote WTRU as a cause of the resume, on condition that a resume message is received from the network, transition the relay WTRU to connected and forwarding the paging message on SL using resource allocation comprised in the resume message.

According to a further embodiment of the relay WTRU, the circuitry is further configured to, after the transmitting a resume message indicating a paging of an IC remote WTRU as a cause of the resume, on condition that a reject (or release) message is received from the network, keep the relay WTRU inactive (e.g., in state RRC_INACTIVE), forward the paging message and indicate to the remote WTRU to trigger a connection, e.g., an RRC connection, via Uu.

FIG. 7 is a flow chart illustrating a further embodiment of a method 700 for determining whether a relay WTRU in RRC_INACTIVE state/inactive relay WTRU may serve a network-initiated connection at a remote WTRU based on the coverage status of the remote WTRU, on a Channel Busy Ratio (CBR), and on access control decision made by the network (e.g., indirect in the resume procedure by the relay WTRU; if the network rejects the relay WTRU, it indirectly rejects the network connection). Serving the network-initiated connection may mean that the relay will serve the connection for the remote WTRU. However, regardless whether the relay serves the connection or not, the relay may still forward the paging to the remote WTRU and make it trigger the connection. The connection is via the relay when the relay may serve it. The method 700 may be implemented by an inactive relay Wireless Receive-Transmit Unit, WTRU, (e.g., by a relay WTRU in RRC_INACTIVE state). The method comprising:

receiving (701) an Out-of-Coverage, OoC, indication from a remote WTRU, indicating that the remote WTRU is OoC of a suitable cell;

receiving (702) a paging message intended for a remote WTRU of a set of remote WTRUs handled by the relay WTRU; and transmitting (703) a resume request message indicating a paging of an OoC remote WTRU as a cause of the resume.

According to a further embodiment, the method 700 may include, after the transmitting a resume request message indicating a paging of an OoC remote WTRU as a cause of the resume, on condition that a resume message is received from the network, forwarding the paging message on Sidelink, SL, using resource allocation provided in the resume message.

According to a further embodiment, the method 700 may include, after the transmitting a resume request message indicating a paging of an OoC remote WTRU as a cause of the resume, on condition that a reject/release is received from the network, dropping the paging message.

According to an embodiment, there is also disclosed a relay wireless transmit/receive unit, WTRU, comprising circuitry comprising a receiver, a transmitter, and at least one processor, the relay WTRU being inactive (e.g., in RRC_INACTIVE state) and the circuitry being configured to: receive an Out-of-Coverage, OoC, indication from a remote WTRU, indicating that a remote WTRU is OoC of a suitable cell; receive a paging message intended for a remote WTRU of a set of remote WTRUs handled by the relay WTRU; and transmit a resume request message indicating a paging of an OoC remote WTRU as a cause of the resume.

According to a further embodiment of the relay WTRU, the circuitry is further configured to, after the transmitting a resume request message indicating a paging of an OoC remote WTRU as a cause of the resume, on condition that a resume message is received from the network, forward the paging message on Sidelink, SL, using resource allocation provided in the resume message.

According to a further embodiment of the relay WTRU, the circuitry is further configured to, after the transmitting a resume request message indicating a paging of an OoC remote WTRU as a cause of the resume, on condition that a reject/release is received from the network, drop the paging message.

Conclusion

While not explicitly described, the present embodiments may be employed in any combination or sub-combination. For example, the present principles are not limited to the described variants, and any arrangement of variants and embodiments can be used. Moreover, the present principles are not limited to the described channel access methods and any other type of channel access methods with different priority levels is compatible with the present principles.

Besides, any characteristic, variant or embodiment described for a method is compatible with an apparatus device comprising means for processing the disclosed method, with a device comprising a processor configured to process the disclosed method, with a computer program product comprising program code instructions and with a non-transitory computer-readable storage medium storing program instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "WTRU" may mean (i) a wireless transmit and/or receive unit, such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed"

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer. In addition, although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A first Wireless Transmit/Receive Unit (WTRU) comprising:
    a processor configured to:
    establish a sidelink (SL) connection with a second WTRU;
    determine to obtain a first set of one or more system information blocks (SIBs);
    send a first request for the first set of one or more SIBs, wherein the first request for the first set of one or more SIBs is sent in a first Uu signaling radio bearer (SRB) message via the second WTRU during operation in accordance with an RRC CONNECTED state;
    receive a first response comprising the first set of one or more SIBs, wherein the first response is received in a second Uu SRB message via the second WTRU during operation in accordance with the RRC CONNECTED state;
    determine to obtain a second set of one or more SIBs;
    send a second request for the second set of one or more SIBs, wherein the second request for the second set of one or more SIBs is sent in a first PC5 radio resource control (RRC) message to the second WTRU during operation in accordance with an RRC IDLE or INACTIVE state; and
    receive a second response comprising the second set of one or more SIBs, wherein the second response is received in a second PC5 RRC message from the second WTRU during operation in accordance with the RRC IDLE or INACTIVE state.

2. The WTRU of claim 1, wherein the processor configured to determine to obtain the second set of one or more SIBs comprises the processor being configured to determine the second set of one or more SIBs based on at least one SIB in the second set of SIBs being a desired SIB that was not previously requested in the first set of one or more SIBs, and wherein the processor is configured to determine to obtain a third set of one or more SIBS based on at least one SIB in the third set of SIBS being a desired SIB that was not previously requested in the second set of one or more SIBs.

3. The first WTRU of claim 1, wherein the first set of one or more SIBs is received via the second Uu SRB message associated with a relayed radio link control (RLC) channel.

4. The first WTRU of claim 1, wherein the second request for the second set of one or more SIBs is sent via the first PC5 RRC message when the first WTRU is in the RRC IDLE or RRC INACTIVE state.

5. The first WTRU of claim 1, wherein the second request for the second set of one or more SIBs is sent to the second WTRU based on a determination that the first request for the first set of one or more SIBs sent to the second WTRU did not indicate a request for at least one SIB desired by the first WTRU.

6. The first WTRU of claim 1, wherein the processor is configured to receive the second response partially in a discovery message and partially in the second PC5 RRC message.

7. The first WTRU of claim 1, wherein at least one of the first request or the second request is based on a list of known SIBs associated with the first WTRU.

8. A method performed by a first Wireless Transmit/Receive Unit (WTRU), the method comprising:
    establishing a sidelink (SL) connection with a second WTRU;
    determining to obtain a first set of one or more system information blocks (SIBs);
    sending a first request for the first set of one or more SIBs, wherein the first request for the first set of one or more SIBs is sent in a first Uu signaling radio bearer (SRB) message via the second WTRU during operation in accordance with an RRC CONNECTED state;
    receiving a first response comprising the first set of one or more SIBs, wherein the first response is received in a second Uu SRB message via the second WTRU during operation in accordance with the RRC CONNECTED state;

determining to obtain a second set of one or more SIBs;

sending a second request for the second set of one or more SIBs, wherein the second request for the second set of one or more SIBs is sent in a first PC5 radio resource control (RRC) message to the second WTRU during operation in accordance with an RRC IDLE or INACTIVE state; and receiving a second response comprising the second set of one or more SIBs, wherein the second response is received in a second PC5 RRC message from the second WTRU during operation in accordance with the RRC IDLE or INACTIVE state.

9. The method of claim 8, wherein determining to obtain the second set of one or more SIBs comprises determining to obtain the second set of one or more SIBs based on at least one SIB in the second set of SIBs being a desired SIB that was not previously requested in the first set of one or more SIBs, and wherein the method comprises determining to obtain a third set of one or more SIBS based on at least one SIB in the third set of SIBS being a desired SIB that was not previously requested in the second set of one or more SIBs.

10. The method of claim 8, wherein the first set of one or more SIBs is received via the second Uu SRB message associated with a relayed radio link control (RLC) channel.

11. The method of claim 8, wherein the second request for the second set of one or more SIBs is sent via the first PC5 RRC message when the first WTRU is in the RRC IDLE or RRC INACTIVE state.

12. The method of claim 8, wherein the second request for the second set of one or more SIBs is sent to the second WTRU based on a determination that the first request for the first set of one or more SIBs sent to the second WTRU did not indicate a request for at least one SIB desired by the first WTRU.

13. The method of claim 8, wherein the second response is received partially in a discovery message and partially in the second PC5 RRC message.

14. The method of claim 8, wherein at least one of the first request or the second request is based on a list of known SIBs associated with the first WTRU.

* * * * *